US011366517B2

(12) United States Patent
Alcaide et al.

(10) Patent No.: US 11,366,517 B2
(45) Date of Patent: Jun. 21, 2022

(54) HUMAN-COMPUTER INTERFACE USING HIGH-SPEED AND ACCURATE TRACKING OF USER INTERACTIONS

(71) Applicant: Neurable Inc., Boston, MA (US)

(72) Inventors: Ramses Alcaide, Boston, MA (US); Dereck Padden, Newton, MA (US); Jay Jantz, Burlington, MA (US); James Hamet, Cambridge, MA (US); Jeffrey Morris, Jr., Cambridge, MA (US); Arnaldo Pereira, Acton, MA (US)

(73) Assignee: Neurable Inc., Boston, MA (US)

( * ) Notice: Subject to any disclaimer, the term of this patent is extended or adjusted under 35 U.S.C. 154(b) by 0 days.

(21) Appl. No.: 16/847,020

(22) Filed: Apr. 13, 2020

(65) Prior Publication Data

US 2021/0064128 A1  Mar. 4, 2021

Related U.S. Application Data

(63) Continuation of application No. 16/138,791, filed on Sep. 21, 2018, now Pat. No. 10,664,050.

(51) Int. Cl.
*G09G 5/00* (2006.01)
*G06F 3/01* (2006.01)
(Continued)

(52) U.S. Cl.
CPC ......... *G06F 3/013* (2013.01); *G02B 27/0172* (2013.01); *G02B 27/0179* (2013.01); (Continued)

(58) Field of Classification Search
CPC .......... G06F 3/013; G06F 3/011; G06F 3/012; G06F 3/015; G06F 3/04815; (Continued)

(56) References Cited

U.S. PATENT DOCUMENTS 4,013,068 A  3/1977  Settle et al.
4,158,196 A  6/1979  Crawford, Jr.
(Continued)

FOREIGN PATENT DOCUMENTS

CA  2 765 500 A1  12/2010
CN  1927551 A  3/2007
(Continued)

OTHER PUBLICATIONS

Non-Final Office Action dated Aug. 15, 2019 for U.S. Appl. No. 16/138,791, 12 pages.
(Continued)

*Primary Examiner* — Jennifer T Nguyen
(74) *Attorney, Agent, or Firm* — Cooley LLP

(57) ABSTRACT

Embodiments described herein relate to systems, devices, and methods for use in the implementation of a human-computer interface using high-speed, and efficient tracking of user interactions with a User Interface/User Experience that is strategically presented to the user. Embodiments described herein also relate to the implementation of a hardware agnostic human-computer interface that uses neural, oculomotor, and/or electromyography signals to mediate user manipulation of machines and devices.

20 Claims, 22 Drawing Sheets
(16 of 22 Drawing Sheet(s) Filed in Color)

(51) Int. Cl.
  *G06F 3/04815* (2022.01)
  *G02B 27/01* (2006.01)
(52) U.S. Cl.
  CPC .............. *G06F 3/011* (2013.01); *G06F 3/012* (2013.01); *G06F 3/015* (2013.01); *G06F 3/04815* (2013.01)
(58) Field of Classification Search
  CPC .... H04N 13/344; H04N 13/383; G02B 27/22; G02B 27/0176; G02B 27/0172
  USPC .......................................................... 345/156
  See application file for complete search history.

(56) References Cited

U.S. PATENT DOCUMENTS

| | | | |
|---|---|---|---|
| 4,595,990 | A | 6/1986 | Garwin et al. |
| 5,137,027 | A | 8/1992 | Rosenfeld |
| 5,213,338 | A | 5/1993 | Brotz |
| 5,269,325 | A | 12/1993 | Robinson et al. |
| 5,325,862 | A | 7/1994 | Lewis et al. |
| 5,339,826 | A | 8/1994 | Schmidt et al. |
| 5,342,410 | A | 8/1994 | Braverman |
| 5,467,777 | A | 11/1995 | Farwell |
| 5,638,826 | A | 6/1997 | Wolpaw et al. |
| 5,692,517 | A | 12/1997 | Junker |
| 5,742,286 | A | 4/1998 | Kung et al. |
| 5,899,867 | A | 5/1999 | Collura |
| 5,931,908 | A | 8/1999 | Gerba et al. |
| 5,967,996 | A | 10/1999 | Kadota et al. |
| 5,983,129 | A | 11/1999 | Cowan et al. |
| 6,090,051 | A | 7/2000 | Marshall |
| 6,323,884 | B1 | 11/2001 | Bird et al. |
| 6,380,937 | B1 | 4/2002 | Dong et al. |
| 6,712,468 | B1 | 3/2004 | Edwards |
| 6,847,844 | B2 | 1/2005 | Sun et al. |
| 6,917,370 | B2 | 7/2005 | Benton |
| 7,084,884 | B1 | 8/2006 | Nelson et al. |
| 7,120,486 | B2 | 10/2006 | Leuthardt et al. |
| 7,546,158 | B2 | 6/2009 | Allison et al. |
| 7,580,742 | B2 | 8/2009 | Tan et al. |
| 7,835,787 | B2 | 11/2010 | Sajda et al. |
| 8,155,736 | B2 | 4/2012 | Sullivan et al. |
| 8,244,475 | B2 | 8/2012 | Aguilar et al. |
| 8,594,814 | B2 | 11/2013 | Rovaglio et al. |
| 8,878,785 | B1 | 11/2014 | Nordstrom |
| 9,183,560 | B2 | 11/2015 | Abelow |
| 9,210,517 | B2 | 12/2015 | Pontoppidan et al. |
| 9,389,685 | B1 | 7/2016 | Pathirage et al. |
| 9,468,541 | B2 | 10/2016 | Contreras-Vidal et al. |
| 9,532,748 | B2 | 1/2017 | Denison et al. |
| 9,563,273 | B2 | 2/2017 | Mann |
| 9,743,002 | B2 | 8/2017 | Wierich |
| 10,664,050 | B2 | 5/2020 | Alcaide et al. |
| 2002/0036381 | A1 | 3/2002 | Scibetta |
| 2002/0065851 | A1 | 5/2002 | Watson et al. |
| 2003/0031457 | A1 | 2/2003 | Miomo et al. |
| 2003/0195798 | A1 | 10/2003 | Goci |
| 2003/0203342 | A1 | 10/2003 | Bowers |
| 2004/0043372 | A1 | 3/2004 | Jebb et al. |
| 2004/0092809 | A1 | 5/2004 | DeCharms |
| 2004/0169673 | A1 | 9/2004 | Crampe et al. |
| 2004/0249302 | A1 | 12/2004 | Donoghue et al. |
| 2005/0017870 | A1 | 1/2005 | Allison et al. |
| 2005/0046698 | A1 | 3/2005 | Knight |
| 2005/0085744 | A1 | 4/2005 | Beverina et al. |
| 2005/0131311 | A1 | 6/2005 | Leuthardt et al. |
| 2005/0170325 | A1 | 8/2005 | Steinberg et al. |
| 2005/0191609 | A1 | 9/2005 | Fadel et al. |
| 2005/0222873 | A1 | 10/2005 | Nephin et al. |
| 2005/0226505 | A1 | 10/2005 | Wilson |
| 2007/0066914 | A1 | 3/2007 | Le et al. |
| 2007/0086773 | A1 | 4/2007 | Ramsten et al. |
| 2007/0166675 | A1 | 7/2007 | Atkins et al. |
| 2007/0166686 | A1 | 7/2007 | Foster |
| 2007/0173733 | A1 | 7/2007 | Le et al. |
| 2007/0179396 | A1 | 8/2007 | Le et al. |
| 2008/0024724 | A1 | 1/2008 | Todd |
| 2008/0065468 | A1 | 3/2008 | Berg et al. |
| 2008/0218472 | A1 | 9/2008 | Breen et al. |
| 2008/0228242 | A1 | 9/2008 | Fink et al. |
| 2008/0317206 | A1 | 12/2008 | Hiroaki |
| 2009/0099623 | A1 | 4/2009 | Bentwich |
| 2009/0125849 | A1 | 5/2009 | Bouvin et al. |
| 2009/0175540 | A1 | 7/2009 | Dariush et al. |
| 2009/0289895 | A1 | 11/2009 | Nakada et al. |
| 2009/0319058 | A1 | 12/2009 | Rovaglio et al. |
| 2010/0010391 | A1 | 1/2010 | Skelton et al. |
| 2010/0039438 | A1 | 2/2010 | Kennedy |
| 2010/0100001 | A1 | 4/2010 | Aguilar |
| 2010/0145215 | A1 | 6/2010 | Pradeep et al. |
| 2010/0240016 | A1 | 9/2010 | Ween et al. |
| 2010/0280403 | A1 | 11/2010 | Erdogmus et al. |
| 2010/0317988 | A1 | 12/2010 | Yoshihisa et al. |
| 2011/0004089 | A1 | 1/2011 | Chou |
| 2011/0148927 | A1 | 6/2011 | Tainsh et al. |
| 2011/0152710 | A1 | 6/2011 | Kim et al. |
| 2011/0159467 | A1 | 6/2011 | Peot et al. |
| 2011/0175932 | A1 | 7/2011 | Yu et al. |
| 2011/0301486 | A1 | 12/2011 | Van Hek et al. |
| 2012/0019662 | A1 | 1/2012 | Maltz et al. |
| 2012/0034583 | A1 | 2/2012 | Dujowich et al. |
| 2012/0036097 | A1 | 2/2012 | Prokhorov |
| 2012/0044154 | A1 | 2/2012 | Black et al. |
| 2012/0150545 | A1 | 6/2012 | Simon |
| 2012/0254745 | A1 | 10/2012 | SanGiovanni et al. |
| 2012/0287284 | A1 | 11/2012 | Jacobsen et al. |
| 2012/0289854 | A1 | 11/2012 | Yamada et al. |
| 2012/0296476 | A1 | 11/2012 | Cale et al. |
| 2013/0050432 | A1 | 2/2013 | Perez et al. |
| 2013/0125027 | A1 | 5/2013 | Abovitz |
| 2013/0130799 | A1 | 5/2013 | Van Hulle et al. |
| 2013/0169560 | A1 | 7/2013 | Cederlund et al. |
| 2013/0335573 | A1 | 12/2013 | Forutanpour et al. |
| 2014/0058528 | A1 | 2/2014 | Contreras-Vidal et al. |
| 2014/0065594 | A1 | 3/2014 | Venable |
| 2014/0223462 | A1 | 8/2014 | Aimone et al. |
| 2014/0225918 | A1 | 8/2014 | Mittal et al. |
| 2014/0228701 | A1* | 8/2014 | Chizeck ............... G06F 21/6254 600/544 |
| 2014/0247232 | A1 | 9/2014 | George-Svahn et al. |
| 2014/0316230 | A1 | 10/2014 | Denison et al. |
| 2014/0320397 | A1* | 10/2014 | Hennessey ............. A61B 3/113 345/156 |
| 2014/0320817 | A1 | 10/2014 | Kiderman et al. |
| 2014/0347265 | A1 | 11/2014 | Aimone et al. |
| 2014/0372957 | A1 | 12/2014 | Keane et al. |
| 2015/0042558 | A1 | 2/2015 | Massonneau et al. |
| 2015/0199010 | A1 | 7/2015 | Coleman et al. |
| 2015/0212576 | A1 | 7/2015 | Ambrus et al. |
| 2015/0212695 | A1 | 7/2015 | Nordstrom et al. |
| 2015/0338915 | A1 | 11/2015 | Publicover et al. |
| 2016/0077547 | A1 | 3/2016 | Aimone et al. |
| 2016/0103484 | A1 | 4/2016 | Guo et al. |
| 2016/0198091 | A1 | 7/2016 | Edwards |
| 2016/0235323 | A1 | 8/2016 | Tadi et al. |
| 2016/0253890 | A1 | 9/2016 | Rabinowitz et al. |
| 2016/0259519 | A1 | 9/2016 | Foss et al. |
| 2017/0078447 | A1 | 3/2017 | Hancock et al. |
| 2017/0124928 | A1 | 5/2017 | Edwin et al. |
| 2017/0188933 | A1 | 7/2017 | Huggins et al. |
| 2017/0290504 | A1 | 10/2017 | Khaderi et al. |
| 2017/0316707 | A1 | 11/2017 | Lawrenson et al. |
| 2017/0323615 | A1 | 11/2017 | Hazra et al. |
| 2018/0008141 | A1 | 1/2018 | Krueger |
| 2018/0039329 | A1* | 2/2018 | Tumey ................... G06F 3/011 |
| 2018/0364810 | A1* | 12/2018 | Parshionikar ........... G06F 3/012 |
| 2019/0286234 | A1* | 9/2019 | Condolo ................ A61B 5/369 |
| 2020/0097076 | A1 | 3/2020 | Alcaide et al. |
| 2020/0192478 | A1 | 6/2020 | Alcaide et al. |

(56) References Cited

U.S. PATENT DOCUMENTS

| | | | |
|---|---|---|---|
| 2020/0268296 | A1 | 8/2020 | Alcaide et al. |
| 2020/0337653 | A1 | 10/2020 | Alcaide et al. |

FOREIGN PATENT DOCUMENTS

| | | | |
|---|---|---|---|
| CN | 101339455 A | 1/2009 | |
| CN | 101515199 A | 8/2009 | |
| CN | 102098639 A | 6/2011 | |
| CN | 103092340 A | 5/2013 | |
| CN | 103421859 A | 12/2013 | |
| CN | 104837088 A | 8/2015 | |
| EP | 2 613 222 A1 | 7/2013 | |
| JP | H 11-65794 A | 3/1999 | |
| JP | 2002-236957 A | 8/2002 | |
| JP | 2003-058298 A | 2/2003 | |
| JP | 2010-15584 A | 1/2010 | |
| JP | 2012-053656 A | 3/2012 | |
| JP | 2013-004006 A | 1/2013 | |
| KR | 10-1023249 B1 | 3/2011 | |
| KR | 10-1579364 B1 | 12/2015 | |
| RU | 2 627 075 C1 | 8/2017 | |
| WO | WO 02/091119 A2 | 11/2002 | |
| WO | WO 03/037231 A1 | 5/2003 | |
| WO | WO 2004/073485 A2 | 9/2004 | |
| WO | WO 2005/079332 A2 | 9/2005 | |
| WO | WO 2006/051709 A1 | 5/2006 | |
| WO | WO 2007/044431 A2 | 4/2007 | |
| WO | WO 2009/056650 A1 | 5/2009 | |
| WO | WO 2009/089532 A1 | 7/2009 | |
| WO | WO 2010/147913 A1 | 12/2010 | |
| WO | WO 2011/105000 A1 | 9/2011 | |
| WO | WO 2011/140303 A1 | 11/2011 | |
| WO | WO 2012/020906 A1 | 2/2012 | |
| WO | WO 2012/071544 A2 | 5/2012 | |
| WO | WO 2013/012739 A1 | 1/2013 | |
| WO | WO 2014/116826 A | 7/2014 | |
| WO | WO 2016/064314 A1 | 4/2016 | |
| WO | WO 2017/031089 A1 | 2/2017 | |
| WO | WO 2018/127782 A1 | 7/2018 | |

OTHER PUBLICATIONS

Non-Final Office Action dated Jun. 12, 2019 for U.S. Appl. No. 15/305,030, 10 pages.
Non-Final Office Action dated Jan. 13, 2020 for U.S. Appl. No. 15/305,030, 12 pages.
Partial Supplementary European Search Report dated Jan. 3, 2018 for European Application No. 15799099.5, 13 pages.
Extended European Search Report dated Apr. 19, 2018 for European Application No. 15799099.5, 13 pages.
International Search Report and Written Opinion dated Oct. 22, 2018 for International Application No. PCT/US2018/047598, 17 pages.
International Search Report and Written Opinion dated Jan. 22, 2019 for International Application No. PCT/US2018/060797, 10 pages.
International Search Report and Written Opinion dated Jun. 20, 2019 for International Application No. PCT/US19/14315, 16 pages.
International Search Report and Written Opinion dated Dec. 18, 2019 for International Application No. PCT/US19/51997, 20 pages
Amyotrophic Lateral Sclerosis (ALS) Fact Sheet, National Institute of Neurological Disorders and Stroke (Jun. 2013), 12 pages.
Aref, A. W., "The P300-Certainty Algorithm: Improving accuracy by withholding erroneous selections," ECNS Conference, Bristol, Tennessee, Sep. 12-16, 2012, p. 79.
Bai, O. et al., "Exploration of computational methods for classification of movement intention during human voluntary movement from single trial EEG," Clin. Neurophysiol., 118:2637-2655 (2007).
Bai, O. et al., "Towards a User-Friendly Brain-Computer Interface: Initial Tests in ALS and PLS Patients," Clin. Neurophysiol., 121:1293-1303(2010).
Bashashati, A. et al., "A survey of signal processing algorithms in brain-computer interfaces based on electrical brain signals," J. Neural. Eng., 4:R32-R57 (2007).
Cipresso, P. et al., "The combined use of Brain Computer Interface and Eye-Tracking technology for cognitive assessment in Amyotrophic Lateral Sclerosis," 2011 5th International Conference on Pervasive Computing Technologies for Healthcare and Workshops, Pervasive Health 2011, 5 pages.
Cipresso, P. et al., "The use of P300-based BCIs in amyotrophic lateral sclerosis: from augmentative and alternative communication to cognitive assessment," Brain and Behavior, 2(4):479-498 (2012).
Connolly, J. F. & D'Arcy, R. C., "Innovations in neuropsychological assessment using event-related brain potentials," Int. J. Psychophysiol., 37:31-47 (2000).
Connolly, J. F. et al., "Performance on WISC-III and WAIS-R NI vocabulary subtests assessed with event-related brain potentials: an innovative method of assessment," J. Clin. Exp. Neurophsychol., 21:444-464 (2010).
D'Arcy, R. C. et al., "Electrophysiological assessment of language function following stroke," Clin. Neurophysiol., 114:662-672 (2003).
D'Arcy, R. C. et al., "Evaluation of reading comprehension with neuropsychological and event-related brain potential (ERP) methods," J. Int. Neuropsychol. Soc., 6(5):556-567 (2000).
Hampshire, A. et al., "Assessing residual reasoning ability in overtly non-communicative patients using fMRI," Neuroimage: Clinical, 2:174-183 (2012).
Iverson, I. H. et al., "A brain-computer interface tool to assess cognitive functions in completely paralyzed patients with amyotrophic lateral sclerosis," Clin. Neurophysiol., 119:2214-2223 (2008).
Kübler, A. et al., "Brain-Computer Interfaces and communication in paralysis: extinction of goal directed thinking in completely paralysed patients?" Clin. Neurophysiol., 119:2658-2666 (2008).
Makeig, S. et al., "Evolving Signal Processing for Brain-Computer Interfaces," Proc. of the IEEE, 100:1567-1584 (2012).
Martens, S. M. M. et al., "Overlap and refractory effects in a brain-computer interface speller based on the visual P300 event related potential; Overlap and refractory effects in a BCI speller based on the visual P300 ERP," Journal of Neural Engineering, 6(2):1741-2552 (2009).
Murguialday, R. A. et al., "Brain-Computer Interface for a Prosthetic Hand Using Local Machine Control and Haptic Feedback," 10th International Conference on Rehabilitation Robotics, IEEE, pp. 609-613 (2007).
Naci, L. et al., "Brain-Computer Interfaces for Communication with Nonresponsive Patients," Ann. Neurol., 72:312-323 (2012).
Perego, P. et al., "Cognitive ability assessment by Brain-Computer Interface: Validation of a new assessment method for cognitive abilities," J. Neurosci. Methods, 201:239-250 (2011).
Power, D. et al., "Towards a system-paced near-infrared spectroscopy braincomputer interface: differentiating prefontal activity due to mental arithmetic and mental singing from the no-control state; Towards a system-paced near-infrared spectroscopy brain-computer interface," Journal of Neural Engineering, 8(6):66004 (2011), 14 pages, doi:10.1088/1741-2560/8/6/066004.
Sellers, E. W. & Donchin, E., "A P300-based brain-computer interface: initial tests by ALS patients," Clin. Neurophysiol., 117:528-548 (2006).
Seo, S. et al., "Discrimination of Yes and No Responses by Auditory Stimuli Multiple-choice Questions in Human EEG," International Conference on Convergence Information Technology, IEEE, pp. 1127-1133 (2007).
Thompson, D. E. et al., "Performance assessment in brain-computer interface-based augmentative and alternative communication," BioMedical Engineering Online, 12:43 (2013), 23 pages, doi: 10.1186/1475-925X-12-43.
Thompson, D. E. et al., "Classifier-based latency estimation: a novel way to estimate and predict BCI accuracy," J. Neural Eng., 10(1):016006 (2013), 13 pages, doi:10.1088/1741-2560/10/1/016006. Epub Dec. 12, 2012.
Vieru, T., "Brain Computer Interface Can Stimulate the Cortex," Softpedia (Feb. 16, 2010), 4 pages.
Zander, T. O. & Kothe, C., "Towards passive brain-computer interfaces: applying brain-computer interface technology to human-

(56) References Cited

OTHER PUBLICATIONS machine systems in general," J. Neural Eng., 8(2):025005 (2011), 5 pages, doi:10.1088/1741-2560/8/2/025005. Epub Mar. 24, 2011.
Non-Final Ofice Action dated Apr. 14, 2021 for U.S. Appl. No. 16/797,376, 18 pages.
Non-Final Office Action dated Nov. 19, 2020 for U.S. Appl. No. 15/305,030, 13 pages.
Final Office Action dated Mar. 12, 2021 for U.S. Appl. No. 15/305,030, 13 pages.
Non-Final Office Action dated Aug. 31, 2021 for U.S. Appl. No. 15/305,030, 17 pages.
International Search Report and Written Opinion dated Aug. 31, 2015 for International Application No. PCT/2015/032192, 9 pages.
Extended European Search Report dated Apr. 19, 2021 for European Application No. 18848298.8, 15 pages.
Extended European Search Report dated Jul. 14, 2021 for European Application No. 18875541.7, 10 pages.
Extended European Search Report dated Jan. 24, 2022 for European Application No. 19741853.6, 12 pages.
Partial Supplementary European Search Report dated Oct. 15, 2021 for European Application No. 19741853.6, 14 pages.
Heun, V. et al., "Smarter Objects: Using AR technology to Program Physical Objects and their Interactions," CH 2013 Extended Abstracts, Apr. 27-May 2, 2013, pp. 961-966 (2013).
Mohsenzadeh, Y. et al., "A State Space Model for Spatial Updating of Remembered Visual Targets during Eye Movements," Frontiers in Systems Nuroscience, vol. 10, May 12, 2016; 10:39, 22 pages; doi:10.3389/fnsys.2016.00039.
Sorger, B. et al., "Another kind of 'BOLD Response': answering multiple-choice questions via online decoded single-trial brain signals," Progress in Brain Research, Chapter 19, vol. 177, pp. 275-292 (2009).
Extended European Search Report dated Apr. 28, 2022 for European Application No. 19861902.5, 7 pages.

* cited by examiner

50:50 weighting

80:20 weighting

FIG. 11A     FIG. 11B

In and/or around Ear and back of head

Around Ear and/or sensors in the back of head

Around ear and /or in ear

Cz and PZ + Around Ear

HUMAN-COMPUTER INTERFACE USING HIGH-SPEED AND ACCURATE TRACKING OF USER INTERACTIONS

CROSS-REFERENCE TO RELATED APPLICATIONS

This application is a continuation of U.S. patent application Ser. No. 16/138,791, filed Sep. 21, 2018 and titled "Human-Computer Interface Using High-Speed and Accurate Tracking of User Interactions," the disclosure of which is hereby incorporated by reference in its entirety.

BACKGROUND

Embodiments described herein relate to systems, devices, and methods for use in the implementation of a brain-computer interface that integrates real-time eye-movement and/or head-movement tracking with brain activity tracking to present and update a user interface (UI) or a user experience (UX) that is strategically designed for high speed and accuracy of human-machine interaction. Embodiments described herein also relate to the implementation of a hardware agnostic brain-computer interface that uses real-time eye tracking and online analysis of neural activity to mediate user manipulation of machines.

A human-computer interface (HCI) is a hardware and software communications system that permits brain activity to control computers or external devices with direct communication pathways between a wired brain and the external device. HCIs have been mainly designed as an assistive technology to provide access to operating machines and applications directly from interpreting brain signals. One of the main goals of HCI development is to provide communication capabilities to severely disabled people who are totally paralyzed or 'locked in' by neurological neuromuscular disorders, such as amyotrophic lateral sclerosis, brain-stem stroke, or spinal cord injury, for whom effective communication with others may be extremely difficult.

Some known implementations of brain computer interfaces include spellers like the one designed by Farwell and Donchin. In this speller, the 26 letters of the alphabet, together with several other symbols and commands, are displayed on-screen in a 6×6 matrix with randomly flashing rows and columns. The user focuses attention on the screen and concentrates successively on the characters to be written, while the neural response of the brain is monitored for signature neural brain signals. Once detected the signature brain signals allow the system to identify the desired symbol. The Farwell-Donchin speller allows people to spell at the rate of about two characters per minute.

SUMMARY

Systems, devices and methods are described herein for various embodiments of a hardware-agnostic, integrated oculomotor-neural hybrid brain computer interface (HCI) platform to track eye movements and brain activity to mediate real-time positioning of a user's gaze or attention and selection/activation of desired action. This disclosure presents an integrated HCI system to address the need for Brain Computer Interfaces that operate with high-speed and accuracy.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIGS. 11A, 11B, and 11C illustrate analyses conducted in the implementation of a semi-supervised eye-movement classification system in a HCI system, according to an embodiment.

DETAILED DESCRIPTION

Figure 1:
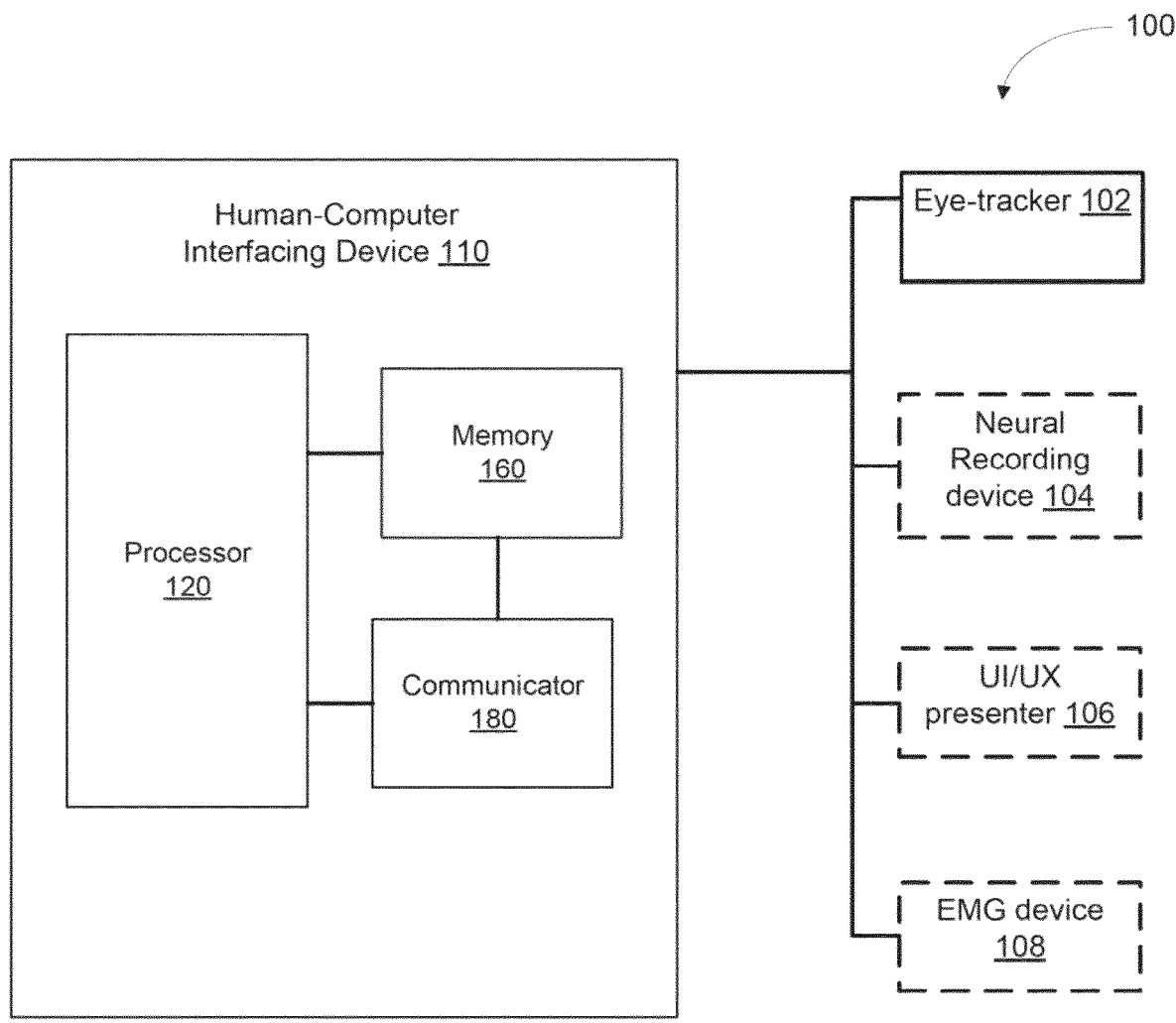
FIG. 1 is a schematic illustration of a hybrid Human Computer Interfacing (HCI) system, according to an embodiment.

Devices, systems, and methods for implementing a Human-Computer Interface are disclosed herein. Embodiments described herein relate to systems, devices, and methods for use in the implementation of the human-computer interface using high-speed, and efficient tracking of user interactions with a User Interface/User Experience that is strategically presented to the user. Embodiments described herein also relate to the implementation of a hardware agnostic human-machine or a human-computer interface that uses neural, eye-movement, and electromyography signals to mediate user manipulation of machines and devices.

Some embodiments described herein relate to an apparatus, the apparatus comprising a display configured to present an interactive environment to a user, an eye-tracker coupled to the display, the eye-tracker including at least one sensor, the at least one sensor being configured to record eye-movement signals from an eye of the user, and an interfacing device operatively coupled to the display and the eye-tracker. Some embodiments described herein relate to an apparatus, the apparatus comprising a display configured to present an interactive environment to a user, an eye-tracker coupled to the display, the eye-tracker including at least two sensors, the at least two sensors being configured to record eye-movement signals from an eye of the user, and an interfacing device operatively coupled to the display and the eye-tracker. The interfacing device can include a memory and a processor operatively coupled to the memory. The processor can be configured to receive the eye-movement signals from the at least two sensors in the eye-tracker, and generate and present a stimulus, via the interactive environment and via the display, to the user. The processor can further be configured to determine, based on the eye-movement signals, a point of focus of the user; determine, based on the point of focus of the user, an action intended by the user; and implement the action intended by the user.

Some embodiments described herein relate a non-transitory processor-readable medium storing code representing instructions to be executed by a processor. The instructions can include code to cause the processor to generate an interactive user environment that can be manipulated, by a user, to perform a set of actions. The instructions can further include code to cause the processor to define a set of stimuli that can be presented to the user via the interactive user environment; present, via a display, at least one stimulus from the set of stimuli to the user; receive, from an eye-tracker, eye-movement signals generated by the user; and automatically calibrate the eye-movement signals based on information related to the presented stimulus, to generate a set of calibrated eye-movement signals. The instructions can further include code to cause the processor to determine, based on the set of calibrated eye-movement signals and the stimulus presented, a point of focus of the user; determine, based on the point of focus, an action intended by the user; and to implement the action via the interactive user environment.

Some embodiments described herein relate to a method, comprising presenting, to a user and via a display, a stimulus included in an interactive user interface and receiving, from an eye-tracker, eye-movement signals associated with the users behavior, the eye-movement signals being recorded independently by one or more sensors positioned on the eye-tracker. In some instances, the eye-movement signals can be recorded by at least two sensors positioned on the eye-tracker. The method can further include receiving information related to the presented stimulus; determining, based on the eye-movement signals, a point of focus of the user; determining, based on the point of focus and the stimulus, an action intended by the user; and implementing the action via the interactive user interface.

As used in this specification, the singular forms "a," "an" and "the" include plural referents unless the context clearly dictates otherwise. Thus, for example, the term "a system" is intended to mean a single system or a combination of system, "an algorithm" or "a procedure" is intended to mean one or more algorithms or procedures or instructions, or a combination thereof. Any of the components or combinations of component described with reference to one embodiment of a HCI system, such as an eye-tracker, a neural recording device, an EMG device or a peripheral head or body tracking device, can used with any other embodiment described herein unless the context clearly dictates otherwise.

An Example Human-Computer Interface System

HCI systems can be designed to present virtual reality environments or experiences to users. HCI systems can be used to assist or enhance the way people operate computers or other data-processing machines and/or software applications without the need for conventional input or output interfaces such as a mouse and a keyboard. HCI systems can also be configured to present augmented reality environments to users to enhance interaction with the real-world. HCIs can also be used to enhance and improve quality of life for patients of disability or limited mobility. HCIs may also provide an interface for more intuitive and natural interaction with a computer than conventional input methods. Additionally, HCIs can also be developed to serve many other functions including augmenting, repairing as well as mapping and researching human and animal cognitive and/or sensory motor systems and their functions. Some example HCI applications include word processors, adapted web browsers, brain mediated control of a wheelchair or neuroprostheses, and games, among others.

For HCI technology to be better suited for patients, useful to the general public, and employed in the control of real-world tasks, the information transfer rate has to be improved to meet a natural interactive pace, the error rate has to be reduced, and the complexity of the interaction interface has to be minimized, compared to current implementations. Additionally, HCI applications demand a high cognitive load from the users, thus the UI/UX and the underlying processing of signals has to be improved to move away from quiet laboratory environments into the real world. In order to configure HCI devices and applications to be easier and more intuitive, there exists a need for improved devices and techniques in the implementation of human machine interfaces or human-computer interfaces that operate with high-speed and high accuracy, in an intuitive manner, to enable user mediated action selection through a natural process.

As described herein, a HCI system includes a hardware, instructions, and a software communications system that interprets human activity such as eye-movement activity or brain activity or other motor activity of the user to control computers or external. In some embodiments, the HCI system can be substantially similar to those described in International Patent Application No. PCT/US2018/047598, entitled, "Brain-computer interface with high-speed eye tracking features," filed Aug. 22, 2018 ("the '598 application"), the disclosure of which is incorporated herein by reference in its entirety.

In some embodiments, the HCI system can include configurations and/or adaptations to implement high-speed and intuitive user interaction with the HCI system and/or connected machines. The configurations or adaptations can be substantially similar to those described in U.S. Patent Application No. 62/585,209 entitled, "Brain-computer interface with adaptations for accurate and intuitive user interactions," filed Nov. 13, 2017 ("the '209 application"), the disclosure of which is incorporated herein by reference in its entirety.

FIG. 1 is a schematic illustration of a Human Computer Interface system 100, according to an embodiment. The example Human Computer Interface system 100 (also referred to herein as "hybrid HCI system" or "HCI system" or "system") includes an eye-tracker 102 and a Human-Computer Interfacing Device 110. The HCI system optionally includes a neural recording device 104, a User Interface/User Experience (UI/UX) Presenter 106, and an electromyography (EMG) device 108 configured to record electromyography signals, as indicated by dashed blocks in FIG. 1.

Eye-Tracker

The eye-tracker 102 in the HCI system 100 can be configured to capture, record, store, and/or transmit eye-movement signals of one eye or both eyes of a user, such that the eye movements can be used to indicate the user's point of focus at any given time (i.e., implement the pointing control feature described above). In other words, the eye-tracker 102 can be used to determine where a user is looking, within their visual field, at any given time, by rapidly following the eye movements of the user in a two or three dimensional space. The eye-tracker 102 can be coupled to the HCI device 110, which can in turn be configured to process the signals acquired by the eye-tracker 102.

The eye-tracker 102 can include one or more sources of illumination, positioned and configured to illuminate each eye of a user. The illumination sources can be configured to emitting light of any suitable wavelength and be mounted at any suitable position to illuminate the pupil of the user and generate a first-surface corneal reflection (CR). The illumination sources can be suitably powered through a power system that is compact and head-mounted. The illumination sources can be suitably connected through wired or wireless connections for data communication to mediate control and transmission of data, etc.

The eye-tracker 102 can include one or more mounted sensors or cameras (e.g., head-mounted video cameras) to image one or both eyes of the user. For example, in some embodiments, the eye-tracker 102 can include one or more sensors positioned to image each eye. In some embodiments, the eye-tracker 102 can be configured to be used with one eye (e.g., the dominant eye). The mounted sensors or cameras can be powered through a compact head-mounted power supply. The sensors or camera can be directly and independently coupled to the Human-Computer Interfacing Device 110, such that the HCI device 110 can receive signals acquired by each sensor or camera, independently, in a sensor-by-sensor manner. The HCI device 110 can process the signals acquired by each of the sensors, as described in further detail herein. In some embodiments, the cameras can be connected to be in communication with each other.

In some embodiments, the eye-tracker 102 can be coupled to a UI/UX presenter that can be used to present a user with an interactive interface, as described herein. In some embodiments, the UI/UX presenter can even be included in the eye-tracker 102. In such embodiments, where the eye-tracker 102 is coupled to a UI/UX or includes a UI/UX, the eye-tracker 102 can include an optional lens (e.g., a display lens), positioned with respect to each eye of the user, the lens being used to project the visual stimuli presented via the UI/UX to the eye of the user, in the case of virtual reality (VR) environments. In some other embodiments, the eye-tracker 102 can include a viewing window configured to view the real-world environment around the user, instead of a simulated interactive user interface in the form of a UI/UX. In such embodiments, the eye-tracker 102 can include a lens (e.g., a viewing lens) positioned with respect to each eye to project the immediate real-world environment of the user, similar to a pair of eye-glasses. In some embodiments, the eye-tracker 102 can include a specially configured lens positioned with respect to each eye of the user to project the real-world environment while also projecting a simulated or synthetically generated user interface to overlay the real-world view. In such embodiments, the eye-tracker 102 can be used to provide an augmented reality (AR) environment to the user.

Referring to the eye-tracker 102, the sensors or cameras can be strategically positioned to capture information about the user's eye-movements such that a gaze angle of the user can be calculated, regardless of whether the user is viewing a real, virtual or augmented environment. For example, in some embodiments, the sensors or cameras can be configured to capture the real-time, relative position and configuration of the user's pupils and the first surface corneal reflection, generated by the sources of illumination, as the user makes eye-movements. In such embodiments, the eye-tracker 102 can be configured to use the positional differences between the pupil and the first-surface CR to determine the orientation and/or the position of the user's eye with respect to the user's head.

In embodiments that include a projecting lens (e.g., a display lens or a viewing lens), the one or more sensors directed to capture eye-movement information from one eye can be positioned around the projecting lens to optimally capture eye-movement signals, while not interfering with the viewing angle. In embodiments that include more than one sensor or camera configured to image each eye, the sensors can be positioned along specific axes to optimally capture eye-movement signals in the form of components or vector subtended along the specific axes. For example, some embodiments of the eye-tracker 102 can include at least two sensors configured to capture eye-movement signals from each eye, the at least two sensors being positioned around the projecting lens, in pairs along orthogonal axes. As an example, eye-trackers including two sensors per eye can be positioned along a horizontal axis. As another example, eye-trackers including four sensors can be positioned in pairs along the horizontal axis and the vertical axis, the axes being orthogonal to each other, as described in further detail herein.

The eye-tracker 102 can in some instances include commercially available head mounted eye-tracking devices such as, for example, eye-tracking devices available from SenseMotoric Instruments, Tobii Eye Tracking, and Pupil-labs among other commercial vendors.

Neural Recording Device

The optional neural recording headset 104 in the HCI system 100 can be configured to capture, record and/or transmit neural control signals from one or more brain regions indicating the user's cognitive intent. The neural recording device 104 can include any suitable recording device or system configured to record neural activity between the neurons, using any suitable approach. The neural control signals can serve as an action control feature indicating the choice of action the user intends to perform. In some embodiments, the neural recording device 104 can be configured to capture neural signal that can be used to indicate the user's point of focus or complement the information obtained from the eye-tracker 102 to indicate the user's point of focus implementing the pointing control feature. For example, in some embodiments, the neural recording device 104 can be configured to record and transmit neural signals that represent a user's voluntary muscle movements (e.g., eye-movements, postural movements, gestures) that can be used to implement a pointing control feature. In some embodiments, the neural recording device 104 can be configured to record and transmit neural signals that correspond to motor imagery (e.g., performed or imagined movements). In some embodiments, the signals acquired by the neural recording device 104 can include neural signals corresponding to brain states such as cognitive, emotional, or attentive states of the user. The neural recording device 104 can be coupled to the HCI device 110, which can in turn process the neural signals to implement a pointing control feature or an action control feature, as described herein.

In some embodiments, neural recording device 104 can be configured to capture neural signals directly by electrically recording the primary ionic currents generated by neurons, the ionic currents flowing within and across neuronal assemblies. In some embodiments, neural recording device 104 can be configured to capture neural signals indirectly by recording secondary currents or other changes in the nervous system, associated with or resulting from the primary currents. For example, neural activity can also be monitored through other methods like optical imaging (e.g., functional magnetic resonance imaging, fMRI), by the recording optical changes that are consequent to the primary currents. Other approaches to recording neural activity of the brain include electroencephalography (EEG), electrocorticography (ECoG), Functional Near-Infrared (FNIR) Imaging and other similar Intrinsic Signal Imaging (IST) methods, magnetoencephalography (MEG), etc.

In some embodiments, the neural recording device 104 can be specifically adapted to record one or more signals including a variety of signature brain signals such as Event Related Potentials (ERPs), Evoked Potentials (EPs e.g., sensory evoked potentials like visually evoked potentials (VEP), auditory evoked potentials (AEP), motor evoked potentials), motor imagery, brain state dependent signals, slow cortical potentials, and other, as yet undiscovered, signature activity potentials underlying various cognitive, attentive or sensorimotor tasks. In some embodiments, the neural recording device 104 can be specifically adapted to record one or more signals in the frequency domain. Some examples among others include sensorimotor rhythms, Event Related Spectral Perturbations (ERSPs), specific signal frequency bands like Theta, Gamma or Mu rhythms, etc.

As described herein, the neural recording device 104 can record neural activity signals to gather information on user intentions through a recording stage that measures brain activity and transduces the information into tractable electrical signals that can be converted into commands. In some embodiments, for example, the neural recording headset 104 can be configured to record electrophysiological activity through electroencephalography (EEG) which has a high temporal resolution, low cost of set-up and maintenance, high portability, and is non-invasive to users. In such embodiments, the neural recording device 104 can include a set of electrodes having sensors that acquire electroencephalography signals from different brain areas. These sensors can measure electrical signals caused by the flow of electric currents during synaptic excitations of the dendrites in the neurons thereby relaying the effects of secondary currents. The neural signals can be recorded through the electrodes in the neural recording device 104 appropriately arranged over desired brain areas when placed over the scalp or portion of head of a user. Example neural recording devices may be available from commercial vendors like Biosemi, Wearable Sensing and G.Tec among others. For example, in some embodiments, the neural recording device 104, its operation in gathering neural brain activity signals, and signal transfer from the neural recording headset 104 can be substantially similar to those described in the '253 application, the disclosure of which is incorporated herein by reference in its entirety above.

UI/UX Presenter

The optional UI/UX presenter 106 included in the HCI system 100 can be configured to present the user with an interactive UI/UX. The UI/UX presenter 106 can be an audio-visual display configured to provide audio-visual inputs to the user. In some embodiments, the UI/UX presenter 106 can provide inputs in additional modalities such as haptic inputs, somatosensory inputs, etc., using one or more peripheral actuators. Some example actuators can include audio speakers, haptic stimulus providers, etc.

In some embodiments, the eye-tracker 102 and/or the neural recording device 104 can include an integrated UI/UX presenter 106. In some other embodiments, the HCI system can include a stand-alone UI/UX separate from the eye-tracker 102 and the neural recording device 104, and in data communication with the rest of the HCI system 100. For example, an eye-tracker 102 integrated with a UI/UX presenter 106 can be a system configured to experience virtual reality environments. In some embodiments, the eye-tracker 102 integrated with a UI/UX presenter 106 can be configured to view augmented reality space. That is, the eye-tracker integrated with the UI/UX presenter can function to view real-world environments, as a pair of eye-glasses, with a superimposed or overlaid UI/UX presented through a display or projecting area (e.g., projecting lens) as described above with reference to the eye-tracker 102.

EMG Device

The HCI system 100 can optionally include the EMG device 108 illustrated in FIG. 1. The EMG device 108 can be configured to be suitably positioned on the body of the user to record and transmit electromyography signals from the user when using the HCI system 100. The EMG device 108 can be coupled to the HCI device 110 and the EMG device 108 can be configured to send acquired signals to the HCI device 110 to be processed. For example, the EMG device 108 can be configured to record facial EMG signals by monitoring facial muscle activity of a user over predetermined facial regions. Facial EMG recorded using the EMG device 108 can be transmitted to the HCI device 110 and used by the HCI system 100 in detecting and interpreting various cognitive or motor states or a user and adapting a UI/UX to the user's state. As another example, facial EMG signals recorded by the EMG device 108 can be used to detect emotional reactions or emotional states of the user while being presented with a UI/UX using the HCI system 100. Some example facial muscles that can be monitored using the EMG device 108 can include the zygomatic muscle that can indicate positive emotional states, and the corrugator muscle that can indicate negative emotional states.

The Human-Computer Interfacing Device

The Human-Computer Interfacing Device (or HCI Device) 110, also referred to herein as "the device", can be a hardware-based computing device and/or a multimedia device, such as, for example, a compute device, a server, a desktop compute device, a smartphone, a tablet, a wearable device, a laptop and/or the like. The HCI device 110 includes a processor 120, a memory 160, and a communicator 180.

The processor 120 can be, for example, a hardware based integrated circuit (IC) or any other suitable processing device configured to run and/or execute a set of instructions or code. For example, the processor 120 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 120 is operatively coupled to the memory 160 through a system bus (for example, address bus, data bus and/or control bus).

Briefly, the processor 120 can be configured to receive and process the eye-movement signals recorded and transmitted by the eye-tracker 102. The processor can be configured to perform functions associated with high-speed eye-tracking such as auto-calibration of eye-movement signals, as described in further detail below. The processor 120 can be further configured to generate and update an interactive UI/UX presented to the user via the UI/UX presenter 106, and receive and process the neural signals recorded and transmitted by the neural recording device 104, the data transmitted by the UI/UX presenter 106, the electromyography signals EMG device 108, and any other signals received from various peripheral sensors and/or actuators coupled to the HCI system 100. The processor 120 can process the received signals and data individually and separately or together as an ensemble. Processing signals received from the various other components like the eye-tracker 102, the neural recording device 104, the UI/UX presenter 106, and the EMG device 108, can include procedures like signal acquisition, signal preprocessing, signal calibration, and/or signal enhancement, etc.

The Processor 120 is further configured to implement user interactions with the UI/UX using a pointing control feature and an action control feature, and to communicate with the eye-tracker 102, the neural recording device 104, the UI/UX presenter 106, the EMG device 108, and various other peripheral sensors and/or actuators, and machines that may be coupled to the HCI system.

The processor 120 can be configured to generate a strategically designed UI/UX to meet specific needs of one or more users. A strategically designed UI/UX can be generated for various needs such as education, entertainment, gaming, equipment control, communication interfaces (e.g., spellers) for disabled persons, etc. In some instances, the UI/UX can be for a training session so that a user may gain the ability to use the HCI system to carry out specific actions (e.g., controlling sophisticated equipment). The processor 120 can be configured to learn and adapt to one or more users. The user-specific training UI/UX can then be adapted to generate a UI/UX for testing and real-world implementation. In some embodiments, the UI/UX can be designed as a virtual reality environment or as an augmented reality environment. In some embodiments, the UI/UX can be custom built for specific needs of a particular user such as, for example, specific user history, reaction times, user preferences, etc. The processor 120 can account for all these requirements in the generation and updating the UI/UX.

In some embodiments, in association with processing the eye-movement signals, the neural oculomotor signals, the EMG signals, and/or signals from peripheral sensors, the processor 120 can also access and process data related to stimuli that were causal or stimuli that were presented via the UI/UX that evoked the signals being processed. With the combined information, the processor 120 can detect relevant signal features based on statistical models, apply suitable confidence scores, as described in further detail below, to predict the user's intent. This predicted intent can then be communicated to the user, via the UI/UX presented through the UI/UC presenter 106 for example, and used to effect change in the UI/UX and in any connected controllable machine or equipment.

The processor 120 can carry out any suitable method for analysis of signals. For example, the Processor 120 can detect a set of features from the signals that can be used to build and apply statistical models to interpret the signals. For example, the Processor 120 can be configured to classify the signals, score the signals and the stimuli evoking the signals, correlate the signals to one or more target stimuli in the UI/UX that may have caused the signals, determine and perform the actions associated with the target stimuli as intended by the user. The Processor 120 can determine and perform the actions intended by the user by implementing the pointing control feature and the action control feature. The Processor 120 is configured to allow users to interact with the UI/UX presented and update the UI/UX based on the user interactions such that the users action lead to the intended consequential events. For example, in some embodiments, where the HCI system 100 can be used by users to manipulate equipment, the Processor 120 presents the UI/UX, receives and processes the eye-movement signals, the neural signals, EMG signals, and/or other peripheral signals from the users, interprets the signals into user interactions, updates the UI/UX based on the user interactions, and controls the equipment based on the user interactions with the UI/UX.

In some embodiments, the processor 120 can include components or units (not shown in FIG. 1) that are configured to perform one or more of the above described functions or other associated processes in the functioning of the processor 120. For example, the processor can include components or units each component or unit being configured to receive signals from the eye-tracker, the neural recording device, EMG device, UI/UX presenter, etc., process the signals received and analyze the signals, and interpret the signals, etc. The processor can further include components configured to generate the UI/UX to be presented to the user via the UI/UX presenter, and components configured to implement suitable changes in the UI/UX based on the interpretation of signals received from a user. The processor 120 can further include components configured to build statistical models using suitable tools (e.g., machine learning tools) to learn associations between signals received from a user (e.g., eye-tracker signals, neural recording signals, EMG signals, etc.) and user's intentions. These associations can be used to train the HCI system 100 to be operated to meet specific user needs. In some embodiments, the various components included in the processor 120 can be software applications or routine or instructions in the form of code that can be stored in the memory 160 and executed by the processor 120. In some embodiments, the HCI device 110 and the processor 120 can be substantially similar to the HCI devices and processors described in the '253 application incorporated herein by reference in its entirety above.

The memory 160 of the HCI device 110 can be, for example, a random access memory (RAM), a memory buffer, a hard drive, a read-only memory (ROM), an erasable programmable read-only memory (EPROM), and/or the like. The memory 120 can store, for example, one or more software modules and/or code that can include instructions to cause the processor 120 to perform one or more processes, functions, and/or the like (e.g., generation of a UI/UX, building statistical models to associate oculomotor or neural or EMG signals received from the user with user intentions, training a HCI system to the user, using statistical models to predict user intentions, controlling machines or equipment coupled to the HCI system, etc.). In some implementations, the memory 160 can be a portable memory (for example, a flash drive, a portable hard disk, and/or the like) that can be operatively coupled to the processor 120. In other instances, the memory can be remotely operatively coupled with the HCI device 110. For example, a remote database server can be operatively coupled to the HCI device 110.

The HCI device includes a communicator 180 configured to receive and send communications between the HCI device 110 and the eye-tracker 102, the neural recording device 104, the UI/UX presenter 106, the EMG device 108, and other peripheral sensors or actuators that may be included in the HCI system 100 (not shown in FIG. 1). The communicator 213 can be a hardware device operatively coupled to the processor 120 and memory 160 and/or software stored in the memory 160 executed by the processor 120. The communicator 180 can be, for example, a network interface card (NIC), a Wi-Fin module, a Bluetooth® module and/or any other suitable wired and/or wireless communication device. Furthermore, the communicator can include a switch, a router, a hub and/or any other network device. In some embodiments, the communicator 120 can be further configured to connect the HCI device 110 to a communication network that may accessible by other users of similar or different HCI systems as the HCI system 100. In some instances, the communicator 180 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. The HCI Device 110 can also be configured to be able to connect to remote servers (not shown in FIG. 1) and access databases or other suitable information contained in remote servers via the communicator 180.

While not shown in the schematic in FIG. 1, in some embodiments the HCI system 100 can include one or more optional peripheral sensors, to collect data about the users behavior thought other modalities like sound, touch, orientation, etc. and peripheral actuators to present a rich, multimodal, user experience.

While not shown in the schematic in FIG. 1, in some embodiments the HCI system 100 can be connected to and integrated with a network of other HCI systems including a central control system or a server system. In such embodiments, the HCI system 100 can present a multi-user experience to each user using each HCI system. In such embodiments, the central control system can be substantially similar to the HCI Device 110 and perform some of the functions that may be common to all users, such as generating and updating a multi-user UI/UX, receiving inputs related to all user movements, etc. Each HCI device 110 of each of the integrated HCI systems can perform localized functions adapted for a single user such as generating and updating a single-user UI/UX, receiving inputs related to a single user movements, etc.

Working of a HCI System

As described above, a HCI system can used to present stimuli to a user through an interactive UI/UX. Signals generated by the user such as eye-movement, neural, or EMG signals can be recorded, analyzed and interpreted and used to effect control of the interactive UI/UX. In some instances, the HCI system may be coupled to external equipment or apparatus or other aspects of a real-world environment and the user's control over the UI/UX can be used to mediate control over the external equipment or apparatus or the associated real-world aspects. The user's control over the UI/UX can include a pointing control feature and an action control feature, mediating the user's interactions with the (UI/UX) feature. The pointing control feature can be analogized to a conventional pointing device like a mouse pointer that allows a user to narrow down to a small set of one or more manipulators or interactable action items (e.g., icons, objects, stimuli, tags, etc.) to control. The action control feature can be analogized to a device that mediates an action (e.g., selection, deselection, etc.), for example a mouse click or a key stroke on a keyboard, that allows the user to implement an action to effect change in the UI/UX or in a connected machine or equipment (e.g., a wheelchair) via the UI/UX. The UI/UX feature in a HCI system can be analogized to an operating system that creates and maintains an environment that implements the pointing and action control features in addition to other features like offering a selection menu, navigation controls, etc.

The action performed by the action control feature can be one of many and can be adapted to suit various versions of UI/UXs designed to control various devices or machines. To name a few examples, the action can be an activation or a deactivation, a continuous or semi-continuous change to the UI/UX. For example, scrolling, hovering, or pinching, zooming, titling, rotating, swiping, among others. The action can also effect an acute change to the UI/UX with discrete starts and stops like highlighting, etc. Some other examples of action control via a UI/UX can include a virtual keyboard control, menu navigation, actions to place and unplace object or items, action to move objects or items, expand and/or shrink objects, movement or navigation of a first person observer or player, changing perspectives of the observer, and actions like grabbing, picking or hovering. Some of these aspects of action control are disclosed below.

In some embodiments of implementing a HCI system, the pointing control feature and methods for identifying a user's point of focus can be implemented by processing the eye-movement signals of the user. In some embodiments, the pointing control feature and methods for identifying a user's point of focus can be implemented through a manipulation of the UI/UX and/or using neural signals that may be informative about the user's point of focus, either by themselves or, in some instances, as complementary to or in addition to processing eye-movement signals. In some embodiments of a HCI system described herein, the pointing control feature can include signals recorded from movement of skeletal muscle groups or individual muscles through various methods such as electromyography. In still other embodiments, a combination of brain signals, signals of muscle movements, eye-movement signals, and strategic manipulation of the UI/UX can be used simultaneously (e.g., a HCI system) or individually, to implement the pointing control feature. In addition to the above mentioned signals, a HCI system that is hybrid or otherwise can also monitor and use other signals from various peripheral sensors (e.g., head position tracking signals, gestures, postural adjustments, etc.).

In some embodiments, the HCI system can implement sophisticated UI/UXs that implement human behavior based control of UI/UX or machines. Specific adaptations to one or more of these features can be implemented, as described below, to achieve high speed and accuracy of human interaction with the HCI system. For example, in some embodiments, the HCI system can be substantially similar to those described in the '598 Application incorporated by reference above.

The UI/UX can be adapted in consideration with the needs to be met by a HCI system. For example, the HCI system to be used by patients for mobility may include UI/UXs targeting ease of use with low cognitive load. As another example, a HCI system used for children as a learning tool may include UI/UXs tailored for intuitive interaction by children. Similarly, HCI systems intended for a gaming experience can include UI/UX designed for high-speed and accuracy, etc. For example, in some embodiments, the HCI system and/or the user interface/user experience (UI/UX) can be substantially similar to those described in the '209 application incorporated by reference above.

The HCI system can be configured to interact with one or more users through the sophisticated UI/UX's that are operated using one or more suites of underlying methods. For example, the HCI system can be configured with underlying analytical tools and methods that are substantially similar to those described in U.S. Patent Application No. 62/618,846 entitled, "Brain-computer interface with adaptations for high-speed, accurate, and intuitive user interactions," filed Jan. 18, 2018 ("the '846 application"), the disclosure of which is incorporated herein by reference in its entirety.

Figure 2B:
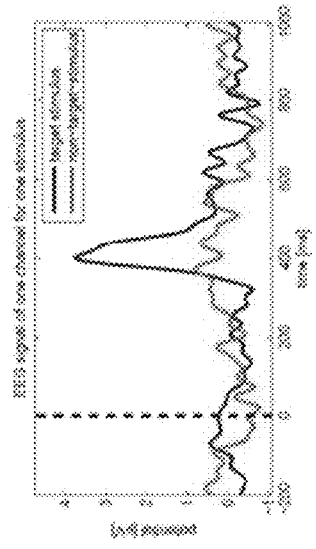
FIGS. 2B and 2C illustrate example eye-movement signals and neural signals recorded during a user's interactions with a user interface of a HCI system, using an eye-tracker and a neural recording headset, respectively, according to an embodiment.
Figure 2C:
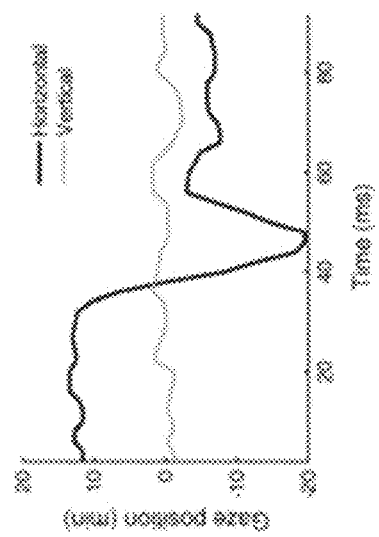
Figure 2A:
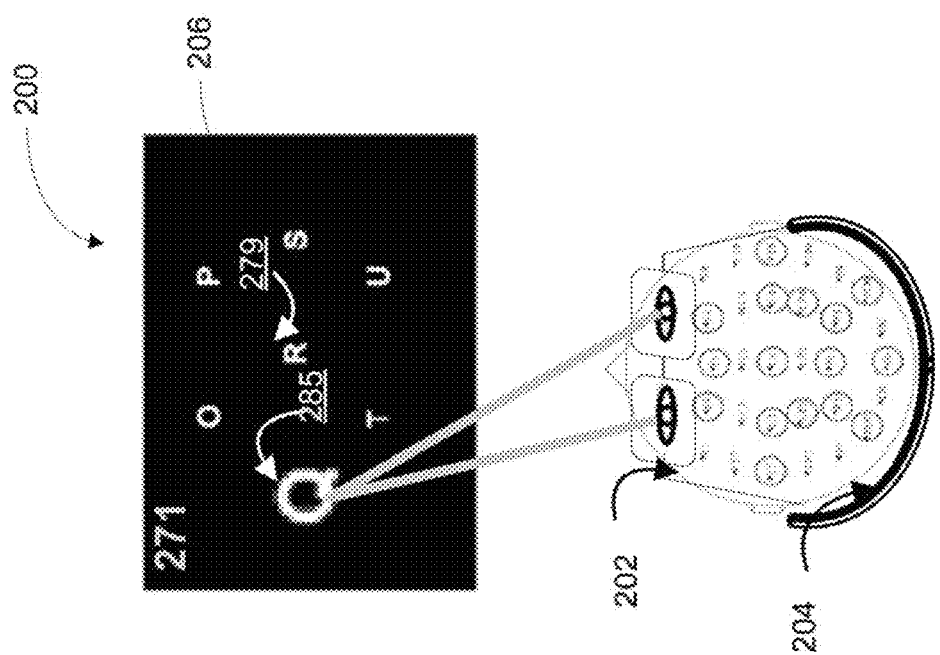
FIG. 2A, is an illustration of a presentation of an example user interface (UI)/user experience (UX) to a user, via an HCI system, according to an embodiment.

FIG. 2A illustrates an example user interaction with an example HCI system 200, via an example UI/UX 271. The system 200 can be substantially similar in structure and or function to the HCI system 100 described above. For example, the BCI system 200 can include an eye-tracker 202, a neural recording device 204, a HCI Device (not shown) and a UI/UX presenter 206 presenting the UI/UX 271. As shown in FIG. 2A, the HCI system 200 can capture eye-movement signals via the eye-tracker 202 and capture neural signals via the neural recording device 204 to help users spell words and/or sentences. The UI/UX 271 can present stimuli in the form of groups of tags or objects, also referred to as tag-group flashes, including tags 279 (e.g., letters, numbers and symbols commonly found on a keyboard) as shown in FIG. 2A. One of the flashed tags can be a target tag 285 of interest to the user, for example the letter Q in the illustration in FIG. 2A. The user is illustrated making eye-movements to gaze or foveate on the target tag 285, the letter "Q", in the UI/UX 271, to select the letter to spell a word. FIGS. 2B and 2C show example eye-movement signals and neural signals associated with a user's foveation or directing a point of focus at a target tag, and the associated neural signal (black) including a signature shape (e.g., an Event Related Potential) upon viewing the target tag. FIG. 2C also shows a neural signal when a user views a tag that is not a target tag (colored magenta), for comparison.

Figure 3:
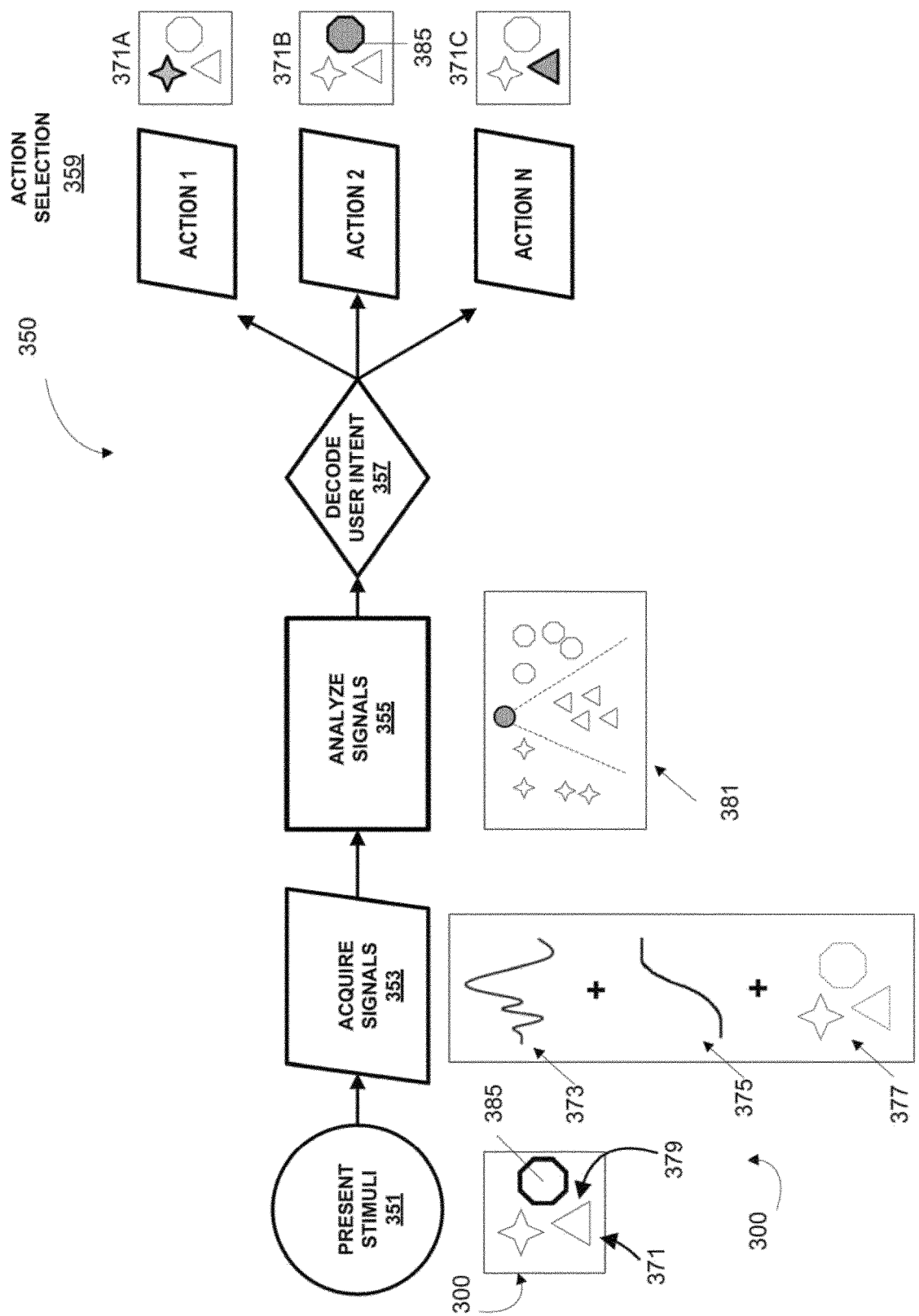
FIG. 3 is an illustration of the sequence of steps in an example implementation of a HCI system, according to an embodiment.

FIG. 3 shows, an example implementation of a HCI system 300 in the form of a schematic flowchart of a process 350. The system 300 can be substantially similar, in structure and/or function, to the system 100 and/or the system 200 described above. In the example implementation illustrated in FIG. 3 a user is presented with a stimulus including a selection of interactable objects 379, also referred to herein as tags, via a UI/UX 371. In an example illustration, one of the tags 379 (e.g., the octagon) may be the target tag 385 of the user's interest. The sequence of events in the example illustrated in FIG. 3 includes presentation of a stimulus (e.g., stimulus including a set of tags associated with a set of actions), acquiring ensuing neural activity signals and oculomotor signals and/or peripheral signals if applicable, analyzing the signals acquired, interpreting these signals to deduce or decode the user's intent, and effecting change in the UI/UX (e.g., by selecting one or more of the tags associated with one or more of the actions). The one or more actions implemented to change the UI/UX can in turn also control one or more external machines connected via the UI/UX.

In the example implementation of the HCI system illustrated in FIG. 3, at step 351 the user is presented the input stimulus. The input stimulus can be, for example, a set of tags or symbols 379 shown in an example UI/UX 371. While all the tags 379 in the UI/UX 371 may be visible, one or more of the tags 379 can be configured to transiently change in visual appearance to indicate their usability for selection. The change in appearance can be a change in any suitable property of the tags (e.g., fill, transparency, intensity, contrast, color, shape, size, orientation, etc.). For example, one or more of the tags 379 can be configured to flash (otherwise referred to herein as a "tag flash") to indicate a potential selection. Different groupings of the visible tags 379 can be configured to flash together resulting in several combinations of tag flashes, or several of tag-group flashes, each tag flash or tag-group flash being a stimulus. It should be noted that while the example stimuli are described to be in the visual modality and changes are presented in the visual modality, any suitable modality can be used to present stimuli and carry out similar action selection. For example, auditory tones can be used as tags. Any suitable auditory property of the auditory tags can be transiently changed to indicate their availability to be selected. For example, properties like loudness, duration, pitch, chirp, timbre, etc. can be transiently changed to be used as tag flashes in the auditory space of the UI/UX.

The three tags 379 presented in the UI/UX 371 at 351, can be configured to each mediate a distinct action when selected. One of the visible tags can be the target tag or the tag that a user wants to select. The goal of a HCI system (like the HCI system 100 described above), through the example procedure illustrated in FIG. 3, is to determine which of the presented tags 379 is the target tag that the user wants to select.

The UI/UX 371 can be configured to present each visible tag 379 one or more times as a stimulus (by tag flashing, for example) at step 351 and at step 353 the HCI system (e.g., system 100) acquires the ensuing brain activity signal 373 and/or the eye-movement signal 375 and any other signals reporting user behavior (not shown in FIG. 3) along with information about stimulus presentation 377 (e.g., which tag or tag-group was presented, at what time point, at what location of the UI/UX 371, etc.), as applicable.

The available tags 379 can be presented through tag flashing singly or in combinations of tag-groups. Tag flashing in tag-groups can reduce the number of flashed required to locate the target tag 385. In some instances, stimulus presentation can also include pseudo presentation of invisible stimuli, of ghost flashes that are not ties to a tag, are expected to be unnoticed by the user. Ghost flashes can be used to calibrate the stimulus presentation by the UI/UX 371. For example, ghost flashes can be used to set detection thresholds during analysis of signals indicating the user's focus or point of attention on a particular tag 379. The user may be induced to foveate to the target tag of interest by focusing attention on the target tag using both eyes.

At 355 the HCI system analyzes the acquired oculomotor signals 375, neural signals 373 (and other peripheral signals from other sensors) which can be carried out individually or as an ensemble in an integrated approach. The analysis of neural and oculomotor signals (and EMG, peripheral signals) is performed in the context of stimulus information 377. For example, the spatiotemporal properties of the presented stimulus can be correlated with the acquired oculomotor, neural and/or EMG signals. The analysis can include several computational methods such as pre-processing of the signals, feature detection and feature extraction, dimensionality reduction, supervised, unsupervised or semi-supervised classification, building or applying one or more pre-built statistical model to interpret signals, computation of a confidence score of each analysis (e.g., confidence score of the classification), computation of a suitable manner to incorporate and use stimulus information 377 (e.g., application of one or more scaling functions), computation of likelihood of each tag 379 being the target tag 385, decoding and/or decision making regarding the determination of the identity of the target tag 385, etc. The schematic in FIG. 3 illustrates an example classification procedure performed by the HCI system to identify which of the three possible tags presented at 351 can be the target tag of the user's interest.

The step 357 includes determination of the identity of the target tag 385 based on the analyses carried out at step 355. The decision or determination at step 357 can be carried out using any suitable method. For example, using one or more threshold crossing algorithms, or other suitable machine learning tools.

The decision at step 357 can lead to the selection of one of the tags 379 in step 359, as indicated by the three possible outcomes illustrated by UI/UX 371A, 37B, and 371C. The selection in step 359 can in turn lead to the associated action being performed. For example, if the target tag 385 is correctly identified to be the octagon tag, the action 3 associated with the octagon can be performed. One or more step of user verification can also be included to ascertain whether the identification of the target tag 385 was correct. The user can give a feedback on whether the identification of the target tag 385 was right or wrong. This user feedback can be used to affirm or correct the various analytical processes and statistical models used for the determination of the target tag 385 training the HCI system to be a better match for a particular user or a particular use case, etc. The feedback can also be used to train the user. For example, if the information to make the decision at 357 is not sufficient, for example, due to ambiguity, or because one or more signals is too weak, the user can be provided with an indicator to try again under different circumstances (e.g., better focus).

Processing Eye-Movement Signals for Accurate and High-Speed Eye-Tracking

Figure 4A:
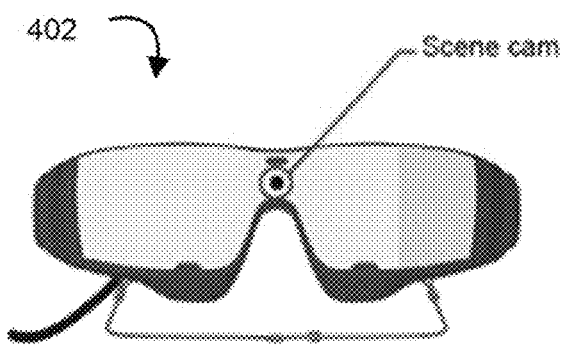
FIGS. 4A and 4B are schematic illustrations of a front view and a back view of an example eye-tracker used in a HCI system, according to an embodiment.
Figure 4B:
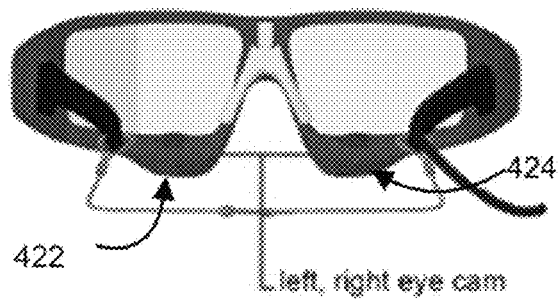

As described herein, the HCI systems 100, 200, and 300 can process eye-movement signals to determine a user's point of focus and a user's intended action, with high speed and accuracy. Eye-movement signals can be captured by eye-trackers described above. FIGS. 4A and 4B illustrates a front view and a rear view of an example eye-tracker 402, of a HCI system 400, which can be substantially similar in structure and/or function to the eye-tracker 102 and 202 described previously of systems 100 and 200, respectively. The eye-tracker 402 includes a left eye camera 422 configured to capture and record movements of the left eye (e.g., gaze angles generated by the left eye) and a right eye camera 424 configured to capture and record movements of the right eye. The eye-tracker 402 also includes a scene camera configured to capture and record the scene or environment (e.g., real-world environment) as viewed by the user.

Independent Sensors

Figure 4C:
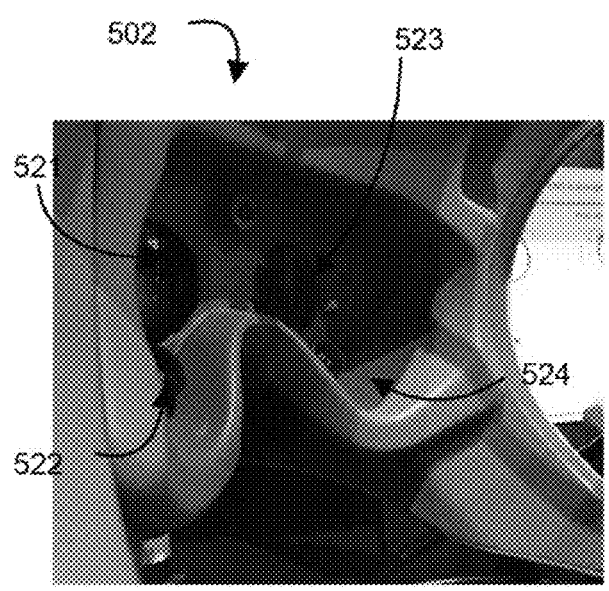
FIG. 4C is a schematic illustration of a perspective view of an example eye-tracker including a head-mounted display, used in a HCI system, according to an embodiment.

In some instances, when the HCI system can be used to present virtual environments the eye-tracker can include a projecting lens to project a virtual environment with an associated UI/UX. An example of such an eye-tracker 502 included in a HCI system 500 is illustrated in FIG. 4C. The system 500 can be substantially similar to the systems 100, 200, 300, and 400, in structure and/or in function. The example eye-tracker 502 includes two projecting lenses 521 and 523 positioned for the left and right eye respectively. The eye-tracker 502 includes sensors 522 and 524 positioned around the lenses 521 and 523, respectively to capture movements of the left eye and the right eye, respectively.

Sensor Positioning and Gaze Angle Calculation

Figure 4D:
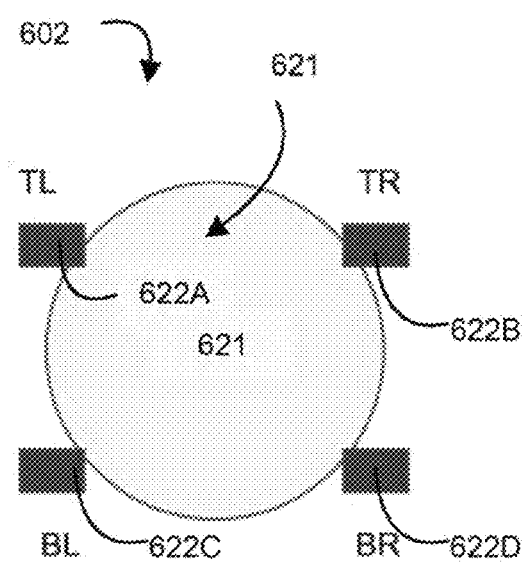
FIG. 4D is a schematic illustration of sensors positioned with respect to a projection lens in an example eye-tracker included in a HCI system, according to an embodiment.

To accomplish high-speed and accurate eye-movement tracking the eye-tracker included in the HCI system (e.g., eye-trackers 102, 202, 402, and 502) can be adapted to include several sensors per eye to capture and record eye-movement signals in a predetermined manner. For example, as described previously, in some embodiments, the eye-tracker can include two or more sensors positioned to capture the eye-movements generated by each eye of the user. The eye-tracker can include projecting lenses positioned to project a UI/UX or a real-world to each eye, and the two or more sensors or cameras configured to capture eye-movements signals can be positioned around the projecting lenses of each eye. FIG. 4D illustrates a perspective view of an eye-tracker 602 included in a HCI system 600, that can be substantially similar in structure and/or function to the systems 100, 200, 300, 400, and/or 500. The illustration of the eye-tracker 602 shows positioning of four sensors 622A, 622B, 622C, and 622D, directed to capture movements of one eye (e.g., a left eye) of a user. The sensors are positioned around the projecting lens 621 of that eye, along two axes, the horizontal axis and the vertical axis. The letters indicate the position of each of the fours sensors with 622A being Top-Left (TL), 622B being Top-Right (TR), 622C being Bottom-Left (BL), and 622D being Bottom-Right (BR). The two axes can be suitably chosen to provide a best indication of the eye positon and eye-movement, for example in terms of gaze position, and gaze angle. As shown, in the example, in some instances, the sensors can be in pairs positioned along axes that are orthogonal to each other to complementarily convey gaze angle along orthogonal directions (e.g., the horizontal and vertical directions).

As described previously with reference to the eye-tracker 102 above, the sensors of the eye-tracker can be configured to capture and record eye position and eye-movement signals independently and transmit the recorded signals to a HCI device (e.g., the HCI device 110 described above) independently, in a sensor specific manner. Said in another way, the signals captured and transmitted by one sensor can be uncorrupted by the signals captured and transmitted by another sensor.

The HCI device may perform suitable processing and analyses based on the signals obtained from the sensors. For example, the HCI device can be configured to obtain eye-movements signals from each of the sensors and calculate gaze direction vectors indicating a gaze angle for each eye, independently, the gaze direction vectors can be calculated with respect to one or more axes (e.g., horizontal gaze vectors having magnitude and direction defined relative to the horizontal axis, or vertical gaze vectors having magnitude and direction defined relative to the vertical axis) to be used to determine gaze position or the user's point of focus (e.g., position along the horizontal and/or the vertical axis). The gaze vectors when subtended with respect to two or more axes, can be used to collectively represent the user's gaze angle. For example, the HCI device can calculate a gaze vector in the horizontal direction (e.g., a vector directed left) and a gaze vector in the vertical direction (e.g., directed top) and collectively they can represent a gaze angle towards the top-left.

The HCI device can obtain additional information from the eye-tracker and/or the UI/UX presenter such as configuration of the eye-tracker, sensor positioning, number of sensors, distance from the user's eyes to the projecting lens, suitable information related to the optical elements of the eye-track (e.g., image formation properties of the projecting lens), the UI/UX presented, etc. The HCI device can use the additional information to locate the user's point of focus with respect to the UI/UX.

In some instances, the HCI device may combine raw eye-movement signals obtained from each of the sensors positioned along one axis to obtain an accurate estimate of the eye-movement along another axis. In some other instances, the HCI device may calculate based on the eye-movement signals from each of the sensors, and then combine gaze vectors calculated from sensors positioned along one axis to obtain an accurate estimate of the eye-movement along another axis. As an example, the HCI device may combine the signals or gaze vectors obtained from the sensor 622A at the top-left position with the signals or gaze vectors obtained from the sensor 622B at the top-right position (e.g., mean (TL,TR)), in FIG. 4D, and combine the signals or gaze vectors obtained from the sensor 622C at the bottom-left position with the signals or gaze vectors obtained from the sensor 622D at the bottom-right position (e.g., mean (BL,BR)) to obtain an average estimate of gaze vector in the vertical axis (e.g., vertical movement=mean (mean (TL,TR), mean (BL,BR))). As another example, the HCI device may combine signals or gaze vectors obtained from the sensors 622B and 622D at the top-right and bottom-right positions (e.g., mean (TR, BR)), and combine signals or gaze vectors obtained from the sensors 622A and 622C at the top-left and bottom-left positions (e.g., mean (TL,BL)) to obtain an average estimate of gaze vector in the horizontal axis (e.g., horizontal movement=mean (mean (TR,BR), mean (TL,BL))). As described before, the gaze vectors along the two axes, orthogonal to each other, can collectively represent the user's gaze angle or eye-movement in the two dimensional plane defined by the two axes.

In some instances, the user's gaze position or point of focus in a three-dimensional space can be determined using information from both eyes (e.g., using depth of focus from binocular gaze determination), and/or by using additional cues from the stimuli presented in the UI/UX such as objects associated with a calculated gaze angle, the object having a perceived depth in the UI/UX. Objects can be associated with a perceived depth by manipulating various features in the UI/UX like relative size and position of the objects compared to other objects in the UI/UX (e.g., smaller and higher objects tend to be perceived to be farther away in depth), objects being partially occluded by other objects (e.g., occlusion by objects perceived to be nearer to the viewer), and by relative movement of the object (e.g., objects farther away move slower than objects closer to a viewer), etc.

Sensor Weighing

Figure 5A:
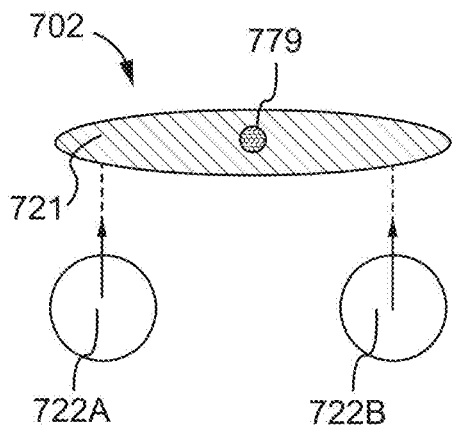
FIGS. 5A and 5B are schematic illustrations of sensors positioned with respect to a lens in an eye-tracker of an example HCI system, to capture a user's eye-movement signals during central and oblique gazes, respectively.
Figure 5B:
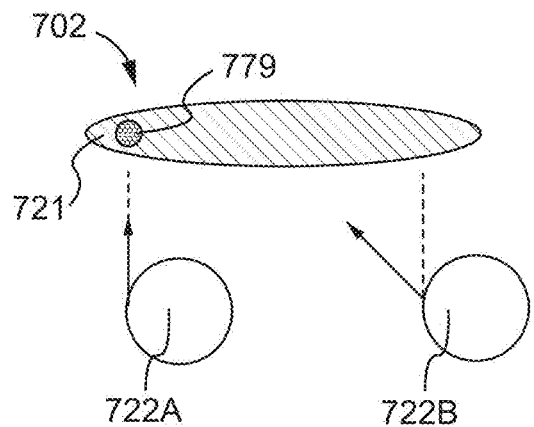

In some implementations, the HCI device can be configured to generate a set of weighting coefficients such that the signals obtained from each of the sensors on the eye-tracker can be weighted with a different weighting coefficient. In some implementations, the weighting can be determined based on the eye-movement or gaze angle of the user, as illustrated in FIGS. 5A and 5B, at two example instances. For example, in some embodiments, an eye-tracker sensor or camera can have increased accuracy and decreased variability when the eye is directly facing the sensor or camera. That is, when a user makes a leftward eye-movement or gaze shift, the eye is closer to the sensors positioned on the left, and the left sensors can have increased accuracy with decreased variability. Conversely, oblique gazes can be hard to detect because of reduced pupil surface available to be captured by the sensor. Based on these observations, when a user makes a directed eye-movement, the HCI device can be configured to coarsely evaluate the eye-movement and update weighting coefficients associated with each sensor coupled to the eye-tracker such that sensors that may benefit from increased accuracy and decreased variability can be relied upon more than the remaining sensors of sensors at a disadvantage due to the eye-movement direction.

FIGS. 5A and 5B illustrate the left projection lens 721 and the sensors 722A and 722B positioned around the lens 721, with respect to the left eye, of an example eye-tracker 702. The eye-tracker 702 can be included in a HCI system 700 (not shown) that can be structurally and/or functionally similar to the HCI systems 100, 200, 300, 400, 500, and 600, described previously. The lens 721 can be used to project a target stimulus 779, at various locations within the UI/UX surface. In FIG. 5A the target stimulus 729 is at the center whereas in FIG. 5B the target stimulus is at the left edge of the lens 721. As illustrated in FIG. 5A, when the user makes a forward oriented eye-movement toward the centrally located target stimulus 729 (i.e. the user foveates straight ahead) the sensors 722A and 722B along the horizontal direction (e.g., the left sensor and the right sensor) may each transmit eye-movement signals that result in a calculated gaze vector that is normal to the vertical axis of each sensor (indicated by arrows). The two sensors may be determined to have comparable degrees of accuracy and variability. Thus, an equal weighting (or a 50:50 weighting between the two sensors) may be adopted by the HCI device. However, as illustrated in FIG. 5B, when the user makes an oblique, leftward eye-movement toward the target stimulus 729 at the left edge, the left sensor 722A may transmit eye-movement signals resulting in a gaze vector that is vertical with respect to the central axis of the sensor 722A and have increased accuracy and decreased variability. The right sensor 722B may suffer from decreased accuracy and/or increased variability, and generate a calculated gaze vector with a high degree of obliqueness, indicated by the angled arrow. In such an instance a biased weighting (e.g., a 80:20 weighting) between the two sensors may be adopted to rely more on the sensor 722A and less on the sensor 722B, to better estimate the eye-movement signal to indicate a user's point of focus.

Said in another way, gaze vectors can be calculated for each eye using each of the sensors and the gaze vectors associated with each sensor can be weighted appropriately based on properties of the eye-movement such as the degree of obliqueness with respect to a vertical angle for that sensor of the gaze angle. When the user makes eye-movements in real-time, the weights associated with each sensor can be changed dynamically based on each eye-movement.

In some embodiments, as described above, the eye-tracker can include more than two sensors for each eye, positioned around the lens in pairs along orthogonal axes, as illustrated in the example in FIG. 4D. For example the eye-tracker can include four sensors around each lens to capture eye-movement of each eye, the sensors positioned in pairs along the vertical and horizontal axes. The HCI device may allot weights to each sensor for calculating an average estimate of a vertical gaze vector by combining weighted vertical gaze vectors resulting from signals obtained from each of the sensors. The weights allotted to each of the sensors for calculating the combined vertical gaze vector (e.g., $wTL_V$, $w_{TR-V}$, $w_{BL-V}$ and $w_{BR-V}$) can be based on the degree of obliqueness of the gaze vector subtended with respect to a horizontal normal axis Similarly, the HCI device can calculate an average estimate of a horizontal gaze vector by combining weighted horizontal gaze vectors resulting from signals obtained from each of the sensors. The weights allotted to each of the sensors for calculating the horizontal gaze vector (e.g., $wTL_H$, $w_{TR-H}$, $w_{BL-H}$ and $w_{BR-H}$) can be based on the degree of obliqueness of the gaze vector subtended with respect to a vertical normal axis.

As an example, referring to FIG. 4D, the HCI device may generate a combined horizontal gaze vector by combining weighted horizontal vectors obtained from the sensors 622B and 622D at the top-right and bottom-right positions (e.g., mean (TR,BR)), and from sensors 622A and 622C at the top-left and bottom-left positions (e.g., mean (TL,BL)). The weights allocated to each sensor may be determined dynamically by estimating the degree of obliqueness of the vector with respect to the axis normal to the direction of calculation, with the sensor being weighted more if the degree of obliqueness if reduced. For example, when calculating the horizontal vector the obliqueness is calculated with respect to the vertical axis.

Figure 5C:
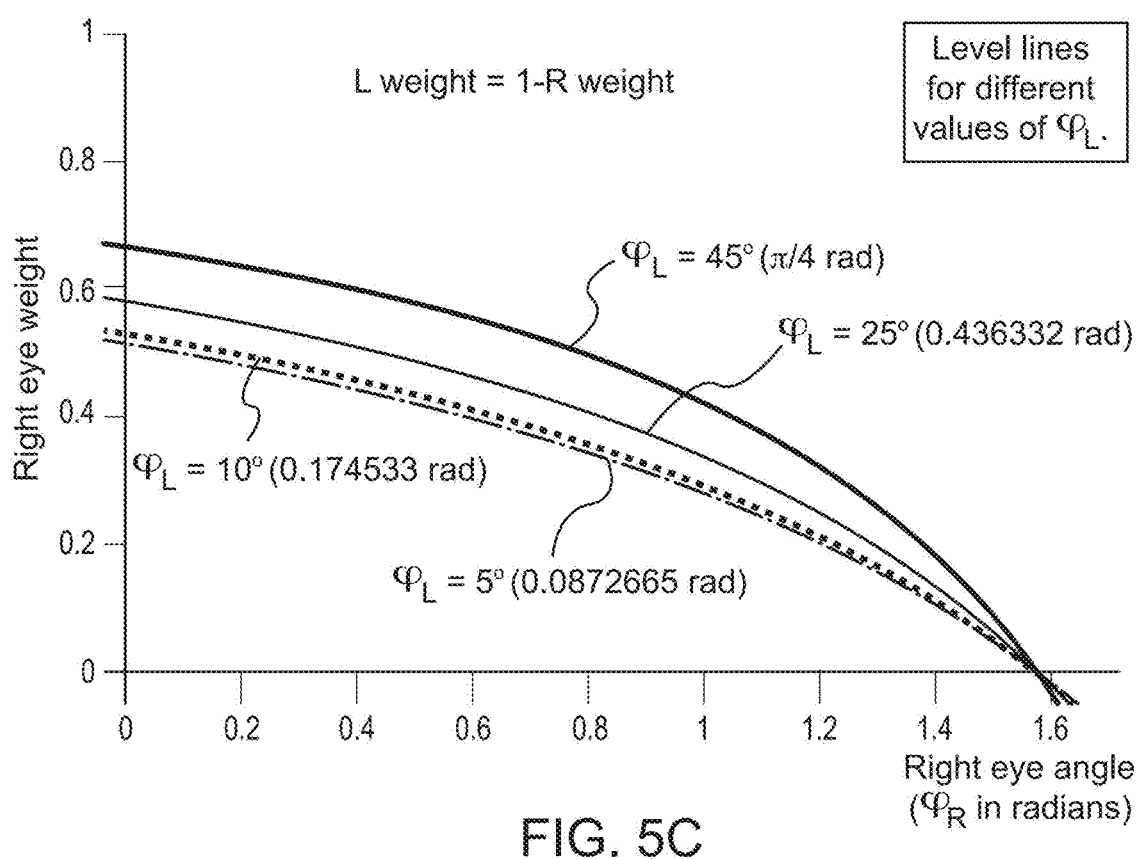
FIG. 5C shows an example weighting function to preferentially weight eye-movement sensors based on gaze position, for improved eye-tracking using a HCI system, according to an embodiment.

Therefore, the horizontal gaze vectors from the sensors 622B and 622D can be combined as (mean ($w_{TR-H}*TR_H$, $w_{BR-H}*BR_H$)) the weights being based on the degree of obliqueness with respect to a vertical axis for each sensor, and the horizontal gaze vectors from the sensors 622A and 622C can be combined as (mean ($w_{TL-H}*TL_H$, $w_{BL-H}*BL_H$)) the weights being based on the degree of obliqueness with respect to a vertical axis for each sensor. In some implementations, the combined gaze vectors resolved along the horizontal axis (into left and right, for example) can further be weighted (e.g., weight R and weight L) based on other parameters such as sensor positioning to obtain an net estimate of gaze vector in the horizontal axis (e.g., horizontal movement=mean (weight R*mean ($w_{TR-H}*TR_H$, $w_{BR-H}*BR_H$)), weight L*mean ($w_{TR-H}*TL_H$, $w_{BL-H}*BL_H$)). In some instances the weighting coefficients can be determined based on a pre-determined weighting function or a weighting formula. FIG. 5C illustrates and example weighting function to determine the weight associated with a right eye-sensor. In some instances, the weighted gaze angles can serve as calibrated eye-movement signals to accurately determine the user's point of focus, while the unweighted gaze angles can serve as course estimated of gaze position. In some embodiments, the HCI device can be configured to perform integrated analyses to process signals acquired from the sensors included in the eye-tracker. In other words, the signals from the sensors can be concatenated to form an ensemble and processed using an integrated approach using appropriate weighting of the signals from each sensor. An example analytical pipeline can include: (1) suitable pre-processing of one or more of the signals through one or more filtration systems (e.g., a dual kalman filter, or any other lagless filter), (2) a Bayesian linear discriminant classifier to classify events registered in significant epochs of the signals (e.g., epochs following or concurrent with a stimulus or tag flash), (3) spatial filtering over the weighted signal package, (4) a bagging ensemble classifier algorithm, and (5) a higher-order oracle algorithm that incorporates information from the classification algorithm with program routines during the experimental task, to improve selection accuracy.

In some implementations, the HCI system can generate a kinematics model based on simulated eye-movements such that missing data or artifactual data in the eye-movement signals obtained from one or more sensors of the eye-tracker can be replaced and compensated for. The kinematics model can be generated using information including anatomy of the eye, configuration of the eye-tracker, information related to the user such as head position, distance between a UI/UX presenter of a projecting lens and the user's eyes, spacing of the user's eyes, etc. In some embodiments, the kinematics model can be configured to generate simulated eye-movement signals of a simulated user (mimicking a real user) in a sensor by sensor basis.

In some implementations, the HCI device can build statistical models of the user's eye-movement based on either aggregate data from other users, or eye-movement data collected from the same user at a previous session or from simulated eye-movement data mimicking the user's eye movement. The HCI device can then use the model to generate predictive eye-movement signals for a user, which can aid in high-speed eye-tracking. In some instances, the HCI device can collect properties of an eye-movement at a given time (e.g., momentum and direction of an ongoing eye-movement at a time Ts) and use the properties to predict the gaze position or eye-movement at a future time point (e.g., time T+t s, where T and t can be time interval values). The HCI device can also utilize the kinematic model for additional accuracy in determining the predicted gaze position or gaze vector of the user, to determine an action intended by the user.

Auto-Calibration

In some implementations of the HCI system described herein, the process of analyzing a user's eye-movement signals to determine the user's point of focus, and/or determining the target stimulus of interest to the user can include accurate calibration of the eye-tracker. Calibration of an eye-tracker can be conducted in one or more incremental and independent processes, as described below. In some instances the calibration can be done automatically for each implementation or each user.

In some implementations the calibration can be conducted overtly (i.e. with explicit knowledge of the user). For example, HCI systems can generate and use stimuli explicitly designed for eye-tracker calibration (e.g., 5-9 point calibration routines), that include predefined calibration points (e.g., 5-9 points) on which the user is instructed to fixate for a predetermined period of time in a supervised manner. In some other implementations automatic calibration can be conducted covertly without the user's knowledge, and therefore in an unobtrusive manner.

Figure 6:
FIG. 6 shows an image of an example stimulus, presented in a UI/UX, used for covert calibration of eye-tracking in a HCI system, according to an embodiment.

Covert calibration can be conducted using stimuli that have a high-likelihood of capturing the user's attention and point of focus, i.e. that are most likely to make the user to foveate to a specific set of points. For example, the UI/UX can be strategically designed to include stimuli where the user is required to foveate to a set of points or is highly likely to do so. FIG. 6 illustrates and example image from a virtual environment presented in a UI/UX, where the user is required to access a door to progress to a next scene or environment. The points on the door (e.g., points used to manipulate the door) represent points that are of high likelihood to have user focus and thus can be used to covertly calibrate the eye-tracker and/or the HCI system to better capture the user's eye-movement signals and to better utilize the UI/UX to present stimuli. Similarly, centers of objects can have higher likelihood of receiving user focus and can serve as covert calibration points.

Figure 7A:
FIG. 7A illustrates an example image presented in a UI/UX.
Figure 7B:
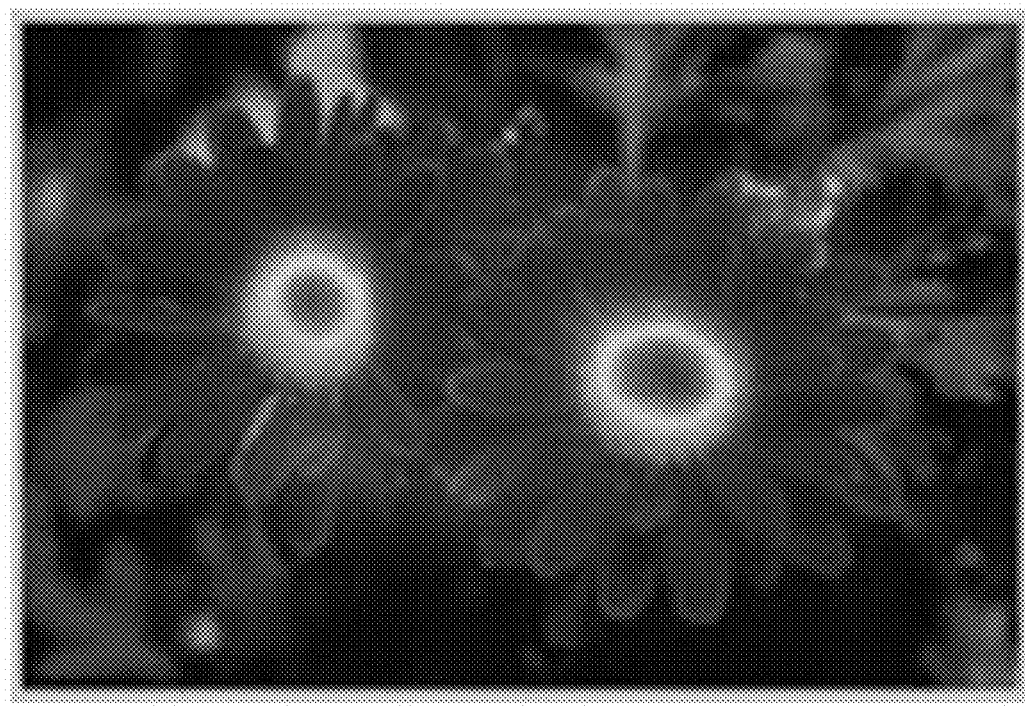
FIG. 7B illustrates the results of example analyses on the image in FIG. 7A for use in covert calibration of eye-tracking in a HCI system according to an embodiment.

As another example, areas in a visual stimulus that include high visual can serve as covert calibration points of eye-movement tracking. Salience can be an emergent property of a visual scene or image projected via a UI/UX. Visual salience can be attributed to objects with differences in visual properties and/or objects with high likelihood of including contextually-relevant information. The HCI system can be configured to analyze images that are included in the UI/UX to determine points of high visual salience to be used in covert calibration. FIGS. 7A and 7B illustrate an example set of analyses to determine the points of high visual salience.

Visual salience in an image can be modeled computationally to predict points of high salience, such as, for example, procedures outlined in the scientific publication by White et al., published on Jan. 24, 2017 in the journal Nature Communications, entitled "Superior colliculus neurons encode a visual saliency map during free viewing of natural dynamic video". Visual stimuli including object of high salience can be generated for use in calibration. Such visual stimuli can also be generated using examples from pre-existing datasets available from remote servers, which include visual scenes with labelled salience levels from various computational models. In some instances, visual stimuli including high salience objects can be generated by combining salience models using a CNN.

In some implementations, HCI systems can use an explicit calibration routine such objects of high salience can included objects including areas with sharp edges, sharp intersecting lines or planes, areas with high contrast, or movement, or objects conveying contextually relevant information. Use an overt calibration algorithm such as 5 or 9 point while directing a user to focus on the points of high visual salience. In some implementations the HCI system can use a kalman filter to process the eye-movements signals obtained from the sensors and use theoretical predictions of intended eye-movement based on statistical or kinematics models to calibrate the eye-movement signals, In some implementations more than one method of calibration can be used incrementally to improve the determination of the user's point of focus.

Scaling and Ranging

Figure 8A:
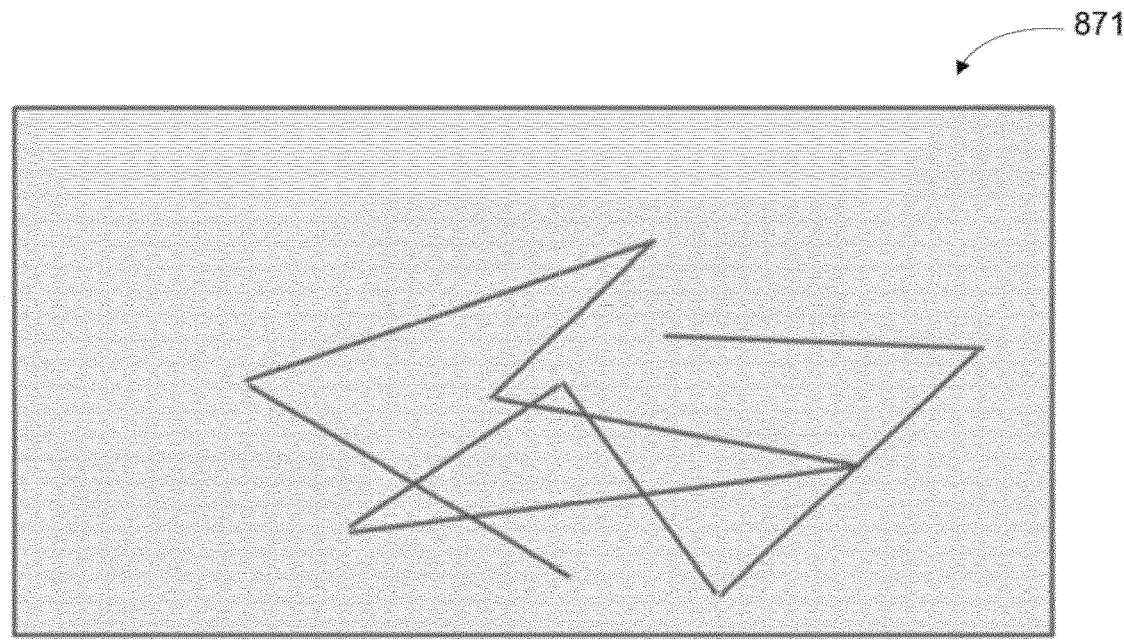
FIGS. 8A and 8B illustrate an example gaze trajectory before and after calibration for scaling and bias, used in eye-tracking in a HCI system, according to an embodiment.

In a HCI system, to fully utilize a UI/UX presented on a UI/UX presenter and to accurately estimate a user's point of focus, the UI/UX can be scaled and ranged to best fit the user's eye-movements. The HCI device coupled to the eye-tracker of a HCI system, can be configured to run a set of pre-programmed instructions to covertly and automatically scale and range the UI/UX to suit the user's eye-movement in an unobtrusive manner. For example, in some implementations, the HCI device can generate and present a visual stimulus via the UI/UX presenter that evokes a user to perform a wide ranging visual search for a pre-determined period of time. The eye-tracker captures and records the series of eye-movements forming a trajectory of gaze position delineating the user's point of focus and conveys the eye-movement signals to the HCI device. FIG. 8A illustrates an example trajectory followed by a user's gaze or point of focus when viewing a UI/UX 871.

The HCI device can be configured to scale and range the UI/UX such that the trajectory maps over a better defined area or region of the UI/UX presenter. As an example, the HCI device can be configured to determine the difference between the maximum and minimum values of the trajectory along the horizontal and vertical directions. The HCI can obtain information related to the display resolution of the UI/UX presenter (e.g., a LCD display). Based on the maximum and minimum values along the two directions, and the resolution information, the HCI device can correct for any bias in the area of the UI/UX available to the user, by updating the UI/UX such that the trajectory is centered on the UI/UX. The HCI device can also scale the UI/UX such that the trajectory spans the entire available surface of the UI/UX to best utilize the display area. An example illustration of a scaled and bias corrected trajectory of the trajectory in FIG. 8A is shown in FIG. 8B via an updated UI/UX 871.

Figure 8B:
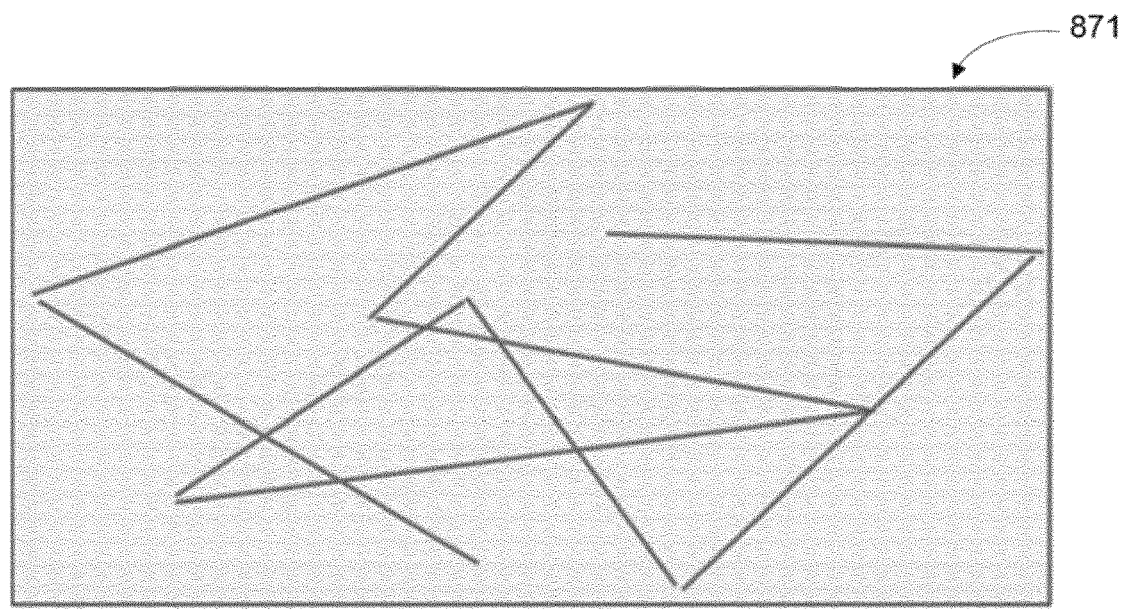

In some instances, the scaling can be done using a linear function, as shown in FIGS. 8A and 8B. In some other instances, the scaling can be carried out using various non-linear functions such as exponential function. Such implementations may be particularly useful under instances where there is exponentially increasing bias with increased gaze angles or increased eccentricity of the gaze angle. The scaling and ranging and correcting for bias can be carried out in consideration to the placement and positioning of the sensors coupled to the eye-tracker that capture and convey the eye-movement signals.

Calibration of Eye-Tracking in Three Dimensions

As described previously, a UI/UX presenter can present a user with a three dimensional UI/UX and the user's gaze position or point of focus in the three dimensional space can be determined via eye-tracking. In some embodiments of the HCI system the accuracy of determining the point of focus in three dimensional space can be calibrated, using stimuli that are suitably configured. For example, the properties of positioning and movement of objects in a UI/UX with respect to a user (e.g., eyes of the user) can be used to calibrate the eye-tracking of the user. One example property to be used for three dimensional eye-tracking is parallax. Parallax is the effect whereby the position or direction of an object appears to differ when viewed from different positions. Thus, in a HCI system, data can be collected regarding the position of a user (e.g., eyes, head and/or body position of the user), and used to track a movement of a user when viewing a stationary UI/UX. Alternatively, a stationary user can be presented with a mobile UI/UX.

The expected position of objects in the UI/UX can be computed from known information related to spacing between the user and the presented UI/UX. From the expected position information, an expected gaze angle and gaze position can be computed to determine an expected point of focus of the user. Eye-movement signals from the eye-tracker can be obtained and processed, as described herein, to determine an actual gaze position or point of focus of the user in the three dimensional space of the UI/UX. The actual point of focus in three-dimensional space can be compared to the expected point of focus to calculate a measure of error. The calculated actual point of focus can then be corrected by applying suitable corrective procedures to the eye-movement signals and/or the gaze vectors computed from the eye-movement signals, to generate calibrated eye-movements signals and/or calibrated determination of actual point of focus.

Figure 9:
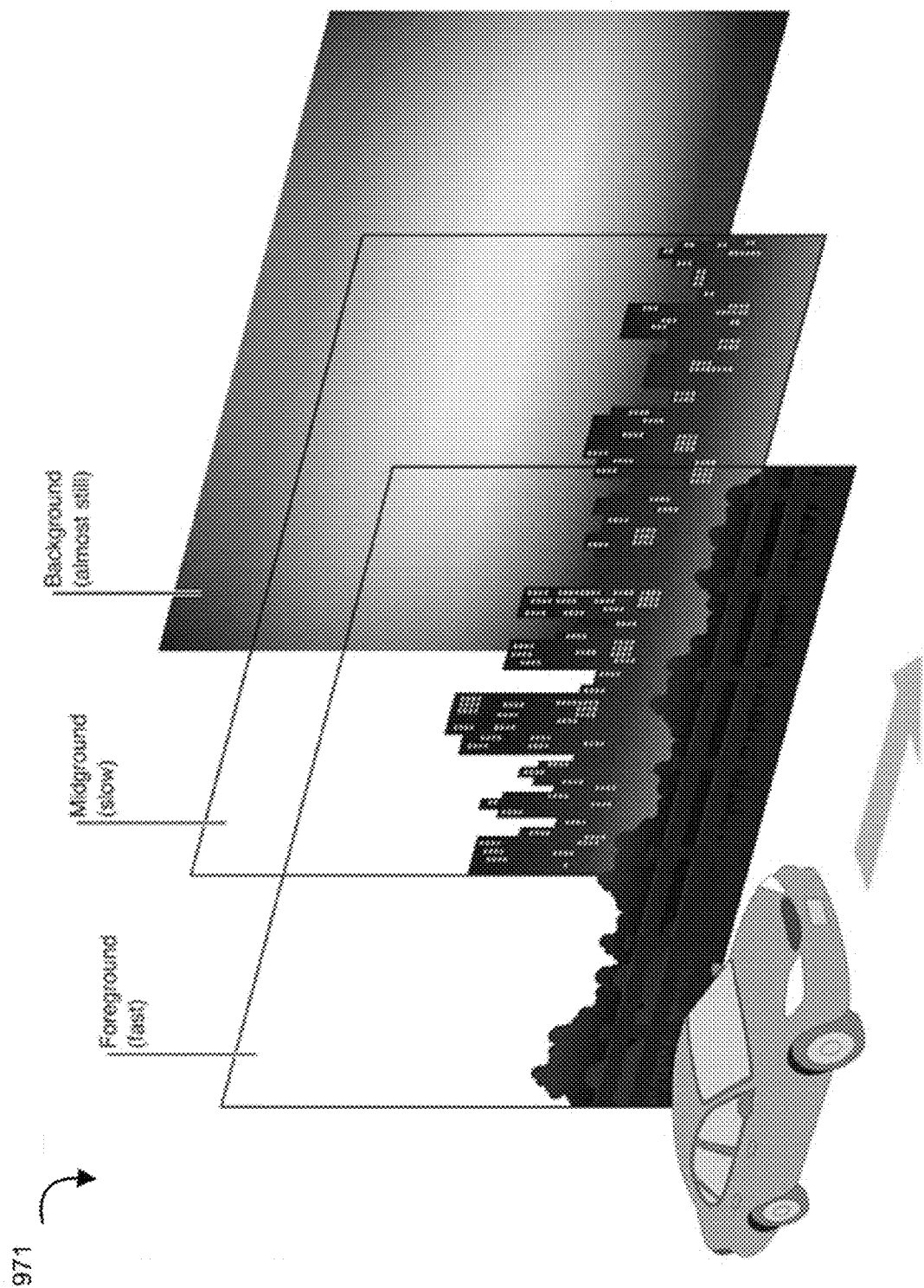
FIG. 9 is an example illustration of the use of parallax, when a user is presented with three-dimensional stimuli in a UI/UX, for calibration of eye-tracking in a HCI system, according to an embodiment.

In some implementations, the user can generate smooth pursuit eye-movements (that are different from saccadic eye-movements). Smooth pursuit eye-movements are generated when a user tracks and follows a moving stimulus, or tracks a stationary stimulus when the user is in motion. The user is expected to have a different relative motion with respect to objects at different depth in the three dimensional space of the UI/UX. An example three dimensional stimulus is illustrated in FIG. 9 in the UI/UX 971, where the user is simulated to be in the car moving with respect to objects in at least three different depths, a foreground (line of trees), a mid-ground (cityscape) and a background (distant horizon). As the car moves in the direction indicated by the arrow, know fixed points in the three depths are expected to move at three different relative velocities in decreasing order. The expected relative velocity between the known objects or points at different depths and the user can be compared to actual relative velocity calculated from eye-movements signals. A measure of error can be computed based on the comparison and corrective measures can be used to calibrate the eye-movement signals and/or points of focus determination as described above.

Using Neural Signals for Calibration of Eye-Tracking

Figure 10:
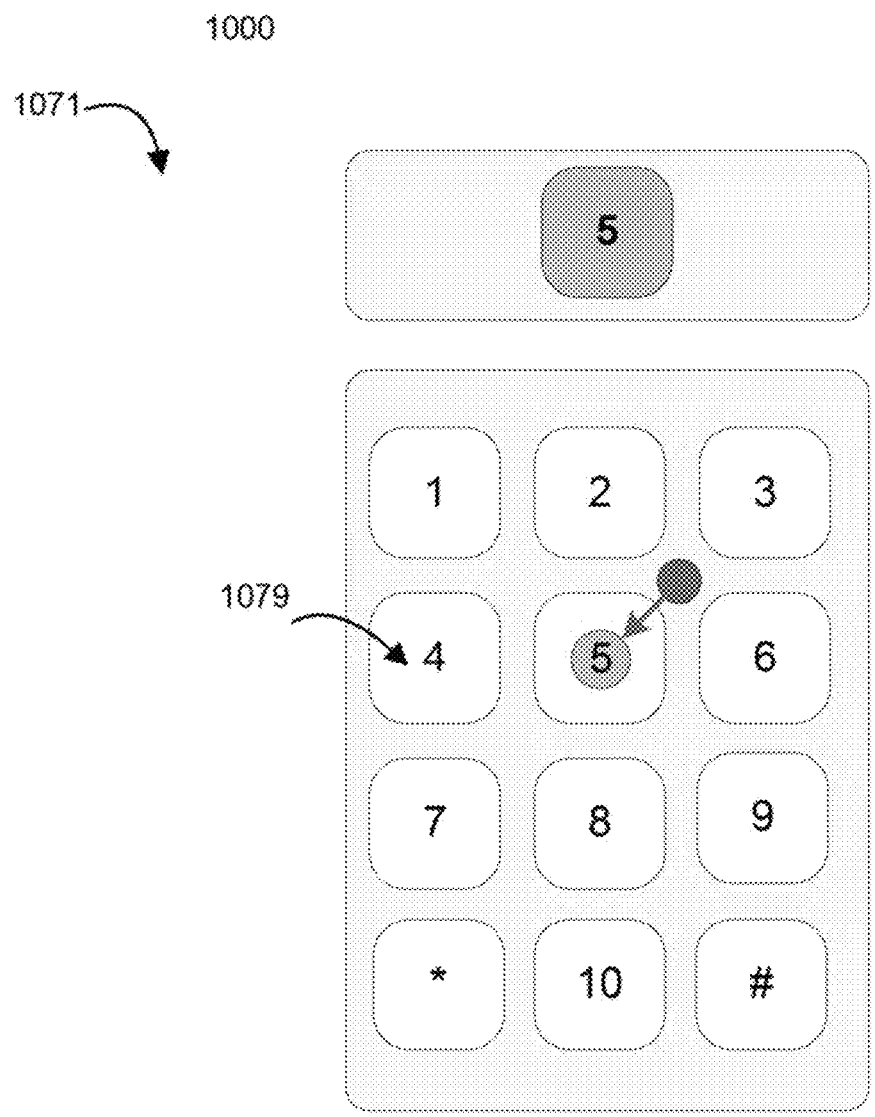
FIG. 10 is an illustration of an example implementation of a HCI system using a brain signal to calibrate eye-tracking, according to an embodiment.

The HCI device can be configured to receive and process neural signals collected via the neural recording device, as described herein. In some implementations, neural signals can be used to calibrate eye-movement tracking based on eye-movement signals received from the eye-tracker. For example, the UI/UX can be configured to present specific predetermined stimuli at specific positions on the UI/UX presenter. Various forms of neural signals can be used to determine a secondary estimate of the user's point of focus at a time of presentation of the visual stimulus. For example, visually evoked potentials (VEPs) including steady-state VEPs can be used to determine a secondary estimate of point of focus. In some implementations, neural signals like event related potentials (ERPs) such as P300 signals can be detected in the recorded neural signals and corroborated with the stimulus presentation to determine a secondary estimate of point of focus. In some implementations the secondary estimate can be used to nudge the point of focus determination based on eye-movement signals obtained from the eye-tracker, in a targeted direction. FIG. 10 illustration an example implementation, where the number 5 is expected to generate an ERP (e.g., a P300 signal) in the UI/UX 1071. The point of focus as determined from the eye-movement signals obtained from the eye-tracker is indicated by the red-marker, shown to be off-positioned with respect to the number 5. The HCI device can receive and process a neural signals from the neural recording device, and detect a P300 signals in the neural signal (e.g., an EEG signal). Based on the detected P300 signal, a secondary estimate of point of focus is determined to be at the position of the number 5, indicated by the orange marker. The HCI device can be configured to compare the point of focus calculated from eye-movement signals (red marker) and the secondary estimate of point of focus (orange marker) to calculate a measure of error and a corrective shift indicated by the orange vector. The eye-movement signals can be automatically calibrated based on the corrective shift vector.

Gaze Movement Classifier

In some embodiments, the HCI device can be configured to process eye-movement signals using an eye-movement classifier. Any suitable classifier can be used to classify gazes of a user including supervised, unsupervised and semi supervised clustering and classifying methods. Classifiers such as linear classifiers, methods suing logistic regression, linear discriminant analysis, support vector machines, and other suitable machine learning tools can be used to classify eye-movements into classes like saccadic movements, non-saccadic movements, smooth pursuit movements, microsaccades etc. For example, in some implementations the eye movement classification system can use a semi-supervised learning approach where labels for saccadic and non-saccadic eye-movements can be created using procedures like K means clustering. The clusters can be fed into a support vector machines.

Figure 11C:
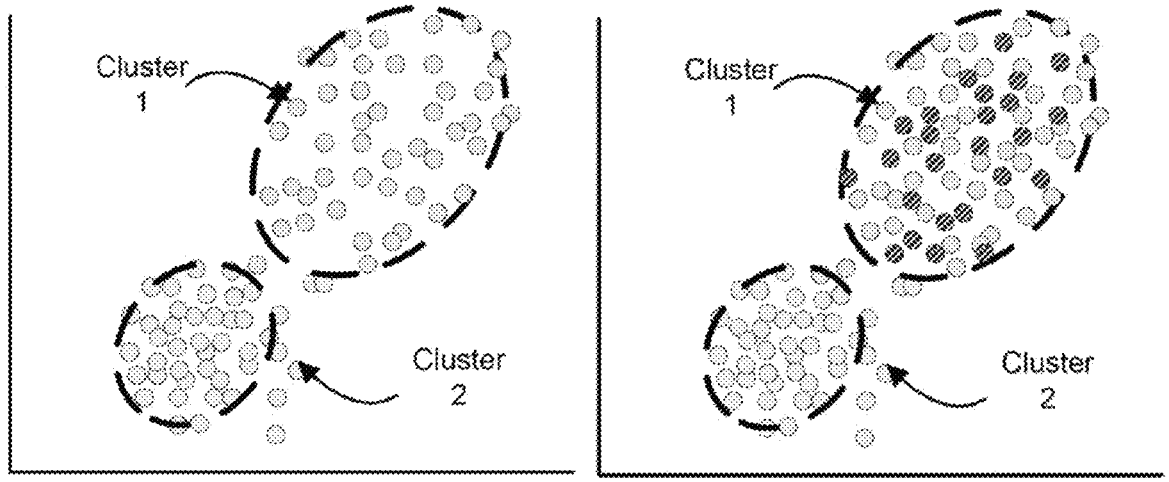
Figure 11C:
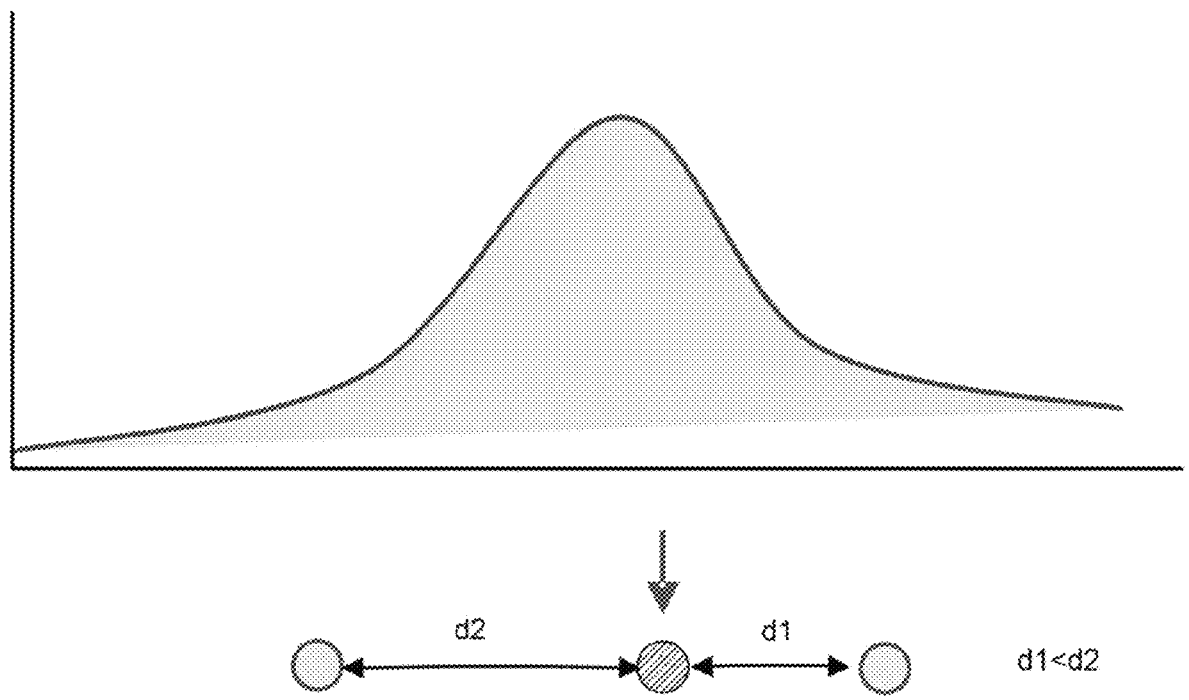

In some instances, the clusters of saccadic and non-saccadic movements can be non-circular, non-spherical or non-ovoid in nature. In such instances, K—means clustering may result in miss-classifications. In such instances, a density based spatial clustering method can be used such as Density Based Spatial Clustering of Applications with Noise (DBSCAN). In some implementations, the density of various clusters may be unequal and the unequal densities can prevent effective classification using DBSCAN procedures. Example clusters with samples of different classes of eye-movement signals, with unequal densities are illustrated in the schematic in FIG. 11A, with cluster 1 having a lower density of samples than cluster 2. The clusters with lower density of samples can be up-sampled as described herein. For example, a preexisting data set of eye-movement signals can be retrieved (e.g., data set including a distribution of eye-movement signals illustrated in FIG. 11C). A set of sample eye-movement signals in the preexisting dataset can be selected and evaluated using a predefined distance metric, "d". The distance metric, "d" can be defined based on a set of features deemed important in classification of eye-movement signals. The set of sample eye-movement signals that measure close to the cluster 2 with lower density, based on the distance metric, can then be used to up-sample the clusters lacking in density to generate clusters of comparable densities as illustrated in FIG. 11B, following which procedures like DBSCAN can be used effectively to classify eye-movement signals. The process of selecting samples, defining distance metric, up-sampling and classification can be performed iteratively to achieve increasingly better results with repetition. DBSCAN does not require a manual specification of the # of clusters—therefore, this system may also be robust to spurious training noise (which in a 2 cluster K means system will be an outlier which shifts the centroid for the nearest cluster). DBSCAN clusters can be used to label trials, which are sent into SVM eye movement classifier for further processing. In instances where assigning new points to a pre-defined cluster may not be easily carried out in an efficient manner, a representation of the trained clusters can be stored for use in future classification needs. For example, the trained clusters can be defined as n-dimensional convex hulls or point clouds with a center and a periphery, and new points in the clusters can be assigned based on shortest distance to the cluster's convex hull or the clusters center and periphery.

Bench Marking Eye-Tracking Performance

Figure 12A:
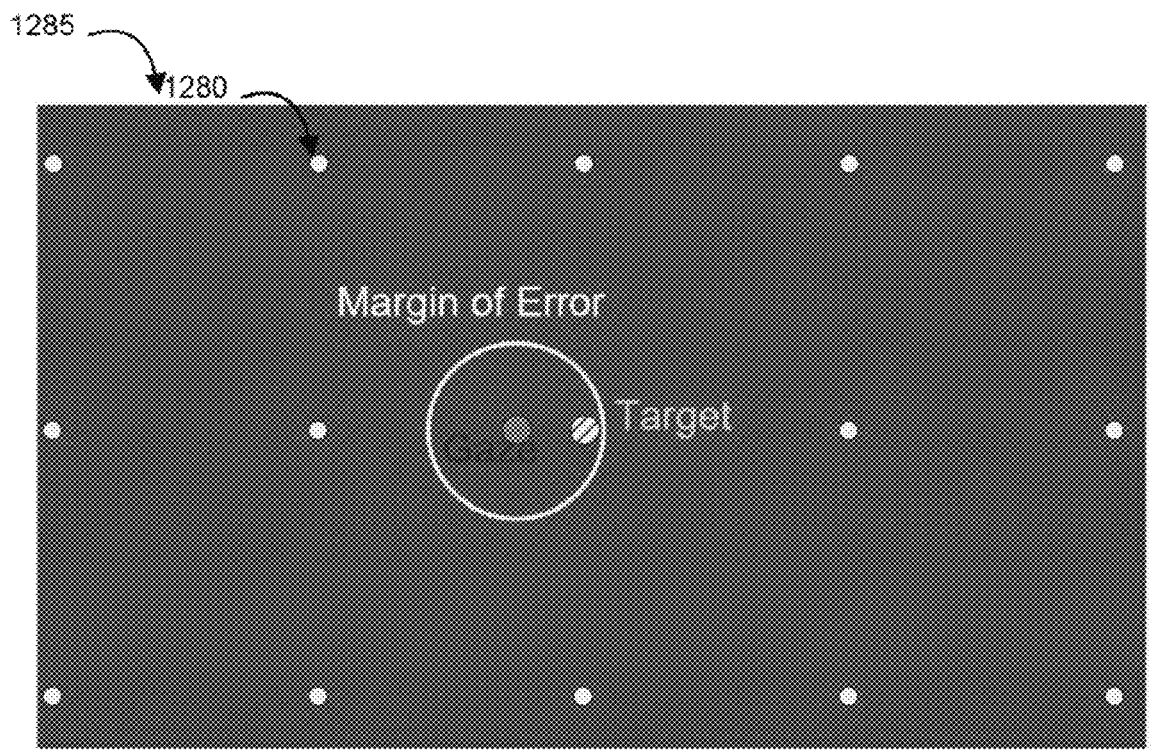
FIGS. 12A and 12B illustrate an example implementation of a bench marking system to evaluate eye-tracking in a HCI system, according to an embodiment.
Figure 12B:
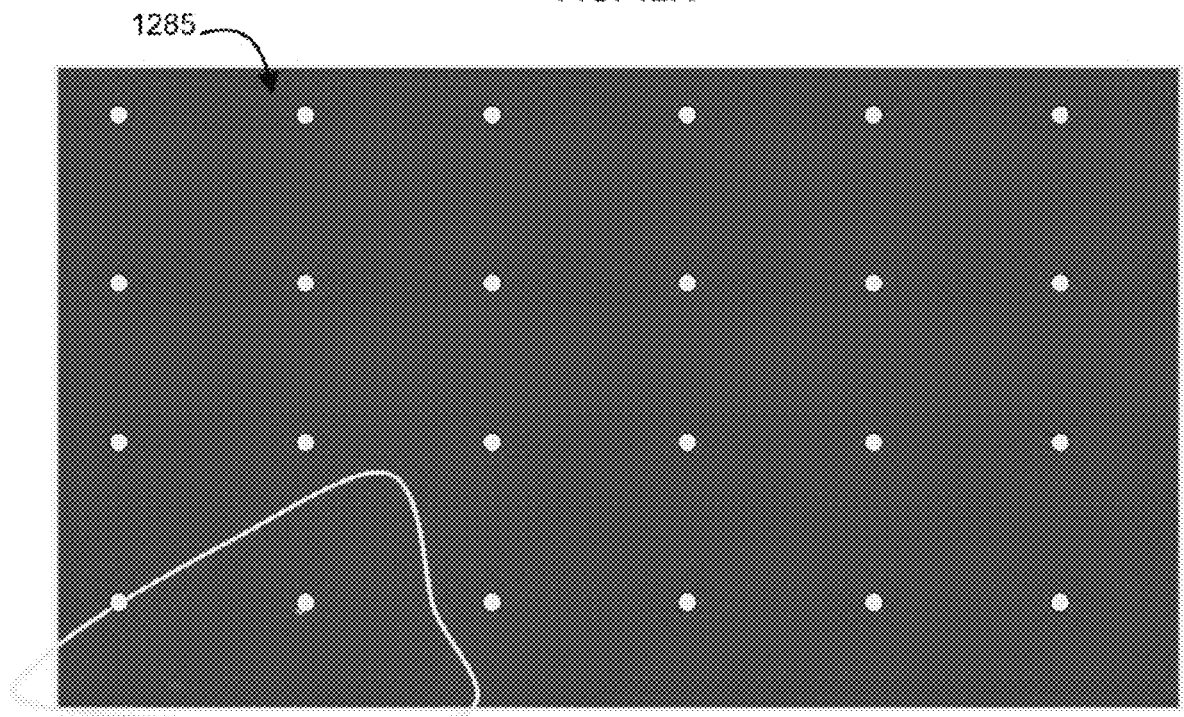

In some implementations of the HCI system, the HCI device can implement an inbuilt benchmarking system to evaluate the accuracy of eye-movement tracking. The bench-marking tool can include a specifically designed stimulus configured to calculate errors in estimation of gaze position or point of focus of the user. FIGS. 12A and 12B illustrates an example interface 1271 in an example bench-marking tool 1285 used in a HCI system, according to an embodiment. The example in FIGS. 12A and 12B includes a debug grid indicated by the grid of points or objects 1280. The grid of objects can be defined in two-dimensional space or in three dimensional space. The properties of the objects 1280 in the grid can be independently defined as required. For example, properties lies the density of objects, the spacing of objects, the size and shape of objects etc. can be defined according to the requirements of an operator of the HCI system. The bench-marking tool 1285 can include a set of controls to vary the properties of the objects and the grid and offer a set of display controls for the operator to modify the properties dynamically during use while evaluating eye-tracking.

A user can be directed to focus on one selected object from the set of objects in the grid by using a visual or graphical indicator such as a target, as shown in FIG. 12A (hatched circle). The expected position of the selected object is recorded. The user's gaze position or point of focus can be calculated using eye-movement signals obtained from the eye-tracker, as described herein. The expected position of the target object and the calculated position of the user's gaze position or point of focus can be compared to determine a measure of error. The process can be repeated for several or all points or objects in the grid. From the measure of error a measure of reliability can be computed as a function of spatial position of the target object. An example spatial map of reliability is illustrated in FIG. 12B, showing higher reliability of eye-tracking in the bottom left portion of the UI/UX presenter. The spatial map of reliability can be used by the HCI device to calculate a margin of error associated with the eye-tracker. The spatial map can be used to model and/or calibrate eye-movement signals based on the portion of the UI/UX presenter the user is trying to focus on. For example, a spatial map may reveal that reliability declines as the eye deviates from the center of the UI/UX, and thus the eye-movement signals can be appropriately corrected with increasingly larger calibration shifts with increasing eccentricity or increasing distance away from the center.

Eye-Tracking User Interactions with Objects

In some implementations of the HCI system, an accurate and high-speed calculation of user interaction with stimuli or objects presented in a UI/UX is necessary for effective functioning of the HCI system. In some embodiments, the UI/UX presented to a user can include a three-dimensional environment with objects positioned in three-dimensional space. In such embodiments, the interaction of the user with specific objects in the three dimensional space can be determined by processes called ray-tracing or ray casting. Ray tracing is a rendering technique for generating an image by tracing the path of light or a path of sight from a user's eye along pixels in an image plane and simulating the effects of its encounters with virtual objects. Ray casting is implemented by following a path of light or a user's gaze angle to form a ray, as pixels, through the camera and through the expected intersection of all objects in the UI/UX Following this, the pixel value from the closest intersection is obtained and is further set as the base for the projection. Ray casting can be distinct from ray tracing, with ray casting being a rendering algorithm which would not recursively trace secondary rays, while ray tracing is capable of doing so.

In some implementations, however, both ray tracing and ray casting can be computationally intensive and/or time consuming. In such implementations, if the UI/UX includes three-dimensional space with three dimensionally positioned objects, the HCI device can implement an improved user-object interaction procedure, as described herein, using a 2D projection of the objects in the 3DF space of the UI/UX. The improved user-object interaction procedure can compute the user's gaze interactions in a way that is much more computationally efficient than 3D ray tracing until collision, more robust to the way human subjects gaze at objects, and can take advantage of an operator's knowledge of the objects' shapes and sizes.

For implementing the improved user-object interaction procedure, the HCI system can include head tracking devices to track the position of the user's head. The HCI system can further obtain a measurement of distance from user's eyes to a tracked head reference point. In some implementations the HCI system can define a physical coordinate system with an origin, and obtain information related to the physical co-ordinate system with respect to the user. When implementing virtual or augmented environments, the HCI system can be configured to convert the VR or AR environments from the virtual coordinate system to a physical coordinate system by using a known scaling factor. In some implementations, the mapping of the VR/AR environments to onto a physical coordinate system can include using information related to rendering transformation and projection matrices used in projecting the UI/UX to the user and can include information related to any distortions or visual effects incurred during the projection such as lens distortions when projecting via the projecting lens.

Figure 13:
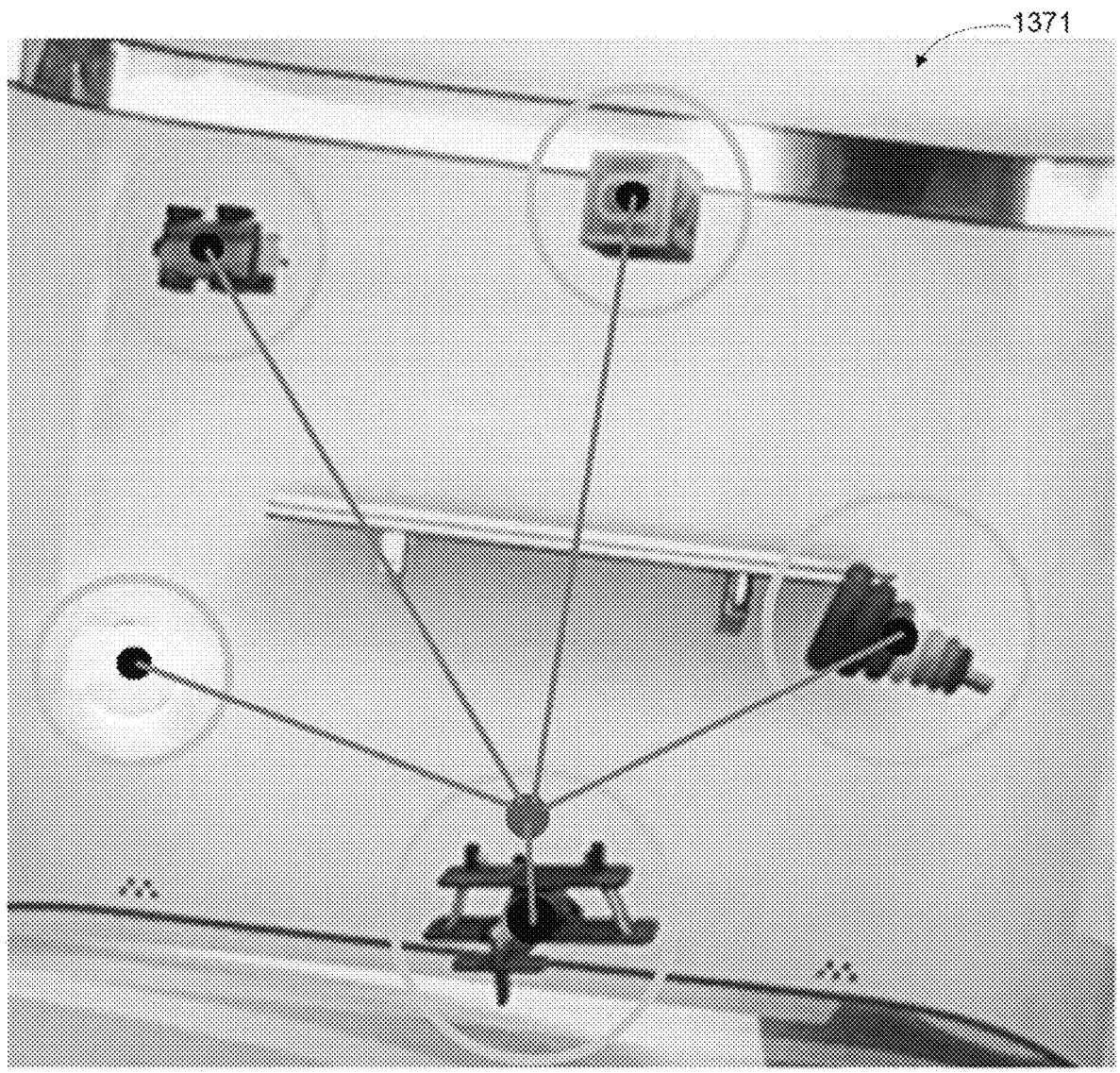
FIG. 13 is an example image illustrating interactable objects, and bounds generated by a HCI system to evaluate the interaction of a user's gaze with the objects, in an example UI/UX presented in the HCI system, according to an embodiment.

In the improved user-object interaction procedure a single gaze point of the user is estimated by calculating the intersection of a binocular 3D gaze vector with a selected plane parallel to the plane of the eyes and in front of the user's head. A 2D projection of this selected plane onto a convenient 2D space is calculating. For example, FIG. 13 illustrates a set of three-dimensional objects in a three dimensional room. A plane closer to the front of the room can be selected such that the plane is in front of the user's eyes and is parallel to the plane of the user's eyes. Each of the objects which may be at different depths in the three dimensional space can be projected on to this selected plane. In some implementations, the selected 2D plane can be near the clipping plane of a 3D projection frustum representing the VR/AR scene viewed by the user. In some implementations, the plane can be generalizable to real-world 3D settings (i.e., the plane at distance d from the midpoint of the user's eyes).

Each interactable 3D object can be evaluated and its center is projected onto the 2D plane. In some instances, the HCI device computes the bounds of the 2D projection of the object as a simple object (a circle, ellipse, or rectangle, for example). These bounds are flexible and can be expanded or contracted based on scene layout and eye-tracker noise. The illustration in FIG. 13 shows example circular bounds around each of the objects in the example scene. The HCI device then calculates whether the gaze of the user is over a particular object and its distance to all objects in a computationally efficient and accurate way compared to 3D ray tracing. For example, the HCI device computes a measure of overlap between the user's gaze position or point of focus and the projected image of the object. In some instances, the HCI determines user interaction based on the measure of overlap between the user's gaze position and the bounds of a projection of an object. In some instances, user interaction can be determined based on a distance measure between a user's gaze position calculated from eye-movements signals and the center or periphery of the projected image of the object on the selected 2D plane.

Figure 14A:
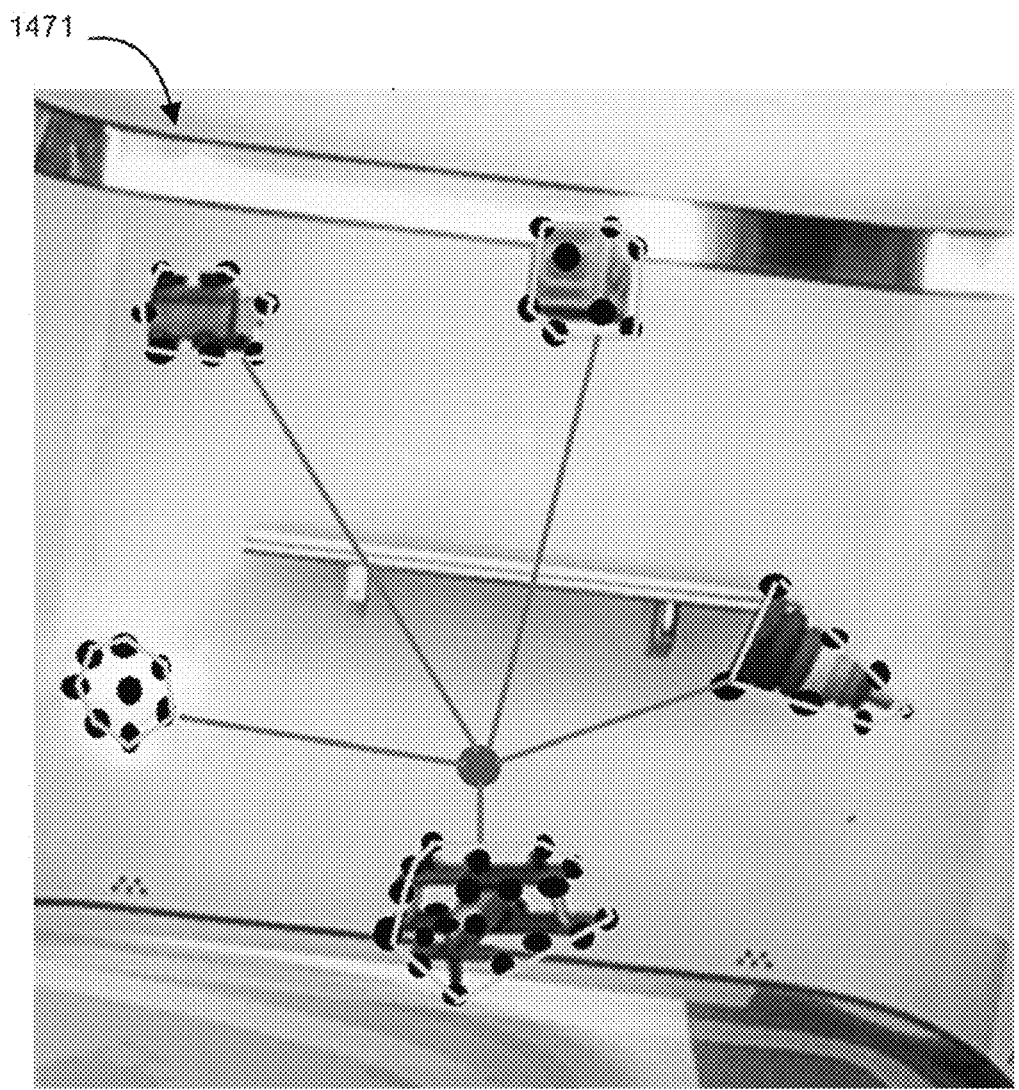
FIG. 14A is a schematic representation of projection of objects delineated in the example UI/UX of FIG. 13, to analyze interactions between a user's gaze and the delineated objects in the UI/UX.

In some implementations, user interaction with 3D objects is carried out by the HCI device identifying a sample of three dimensionally distributed points on each of the interactable 3D object and projects the identified points on to the selected 2D plane upon which the user's gaze position can be located. The identified points can include vertices of a bounding volume or a decimated collection of the object model's vertices, for example, as illustrated by the black points overlaid on the objects in FIG. 14A. The 2D projections of the sampled points for each object is then used to calculate a convex hull of the object's projection on to the two dimensional plane corresponding to the user's view of the object.

Figure 14B:
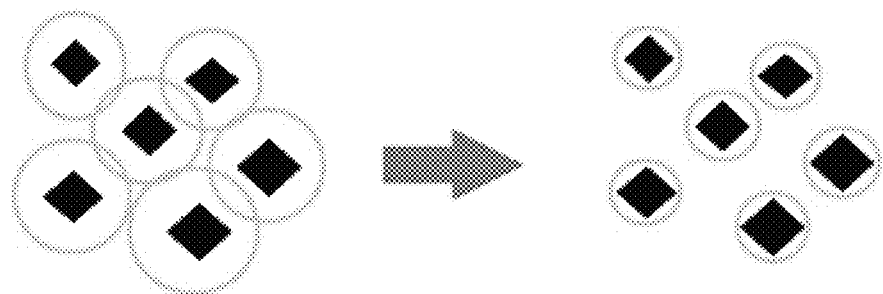
FIG. 14B is a schematic representation of an example process of scaling used while analyzing interactions between a user's gaze and objects in a UI/UX, in the implementation of a HCI system, according to an embodiment.

In some implementations, the HCI device can apply computational geometry techniques to determine whether the user's gaze is on an object, or how far the gaze is to an edge of the nearest object's convex hull. The computed convex hulls can be defined based on predefined parameters like number of points, point spacing, etc. The HCI device can generate and display a set of controls to modify parameters defining the computation of convex hulls, and offer controls to an operator of the HCI system to dynamically change the parameters to be flexible and customized to different UI/UX environments. For example the convex hull can be expanded or contracted based on scene layout and eye-tracker noise, as shown in examples illustrated in FIG. 14B.

Using either the convex hull including sampled points or simple 2D object representation, the HCI device can expand or contract the bounds of the 2D projections of objects based on the density of active visible objects in the scene the user is interacting with and their bounds. The exact scaling used by the procedure or algorithm can be empirically derived from data sets available.

Additionally, any nonlinear scaling parameter (e.g., exponential scaling) used for scoring interactable objects based on distance to the user's gaze (described herein) can also be dynamically adjusted (e.g., adjusted by the operator in real time) based on the average distance between interactable objects in the active scene.

Scoring of Interactable Objects to Identify Intended Target Object

In some implementations, a HCI system is configured to present a set of options as stimuli and decode, from signals recorded from the user indicating the user's behavior (e.g., eye-movement signals or neural signals), the intent of a user to select one particular stimulus that can initiate or mediate an action. The set of stimuli presented to the user can be a set of interactable objects (also referred to as tags) of which one particular object is of interest to the user. This object of interest can be referred to as a target object. Thus, said in another way, one goal of such a HCI system can be to identify with a certain degree of precision and confidence, the identity of the target object from the set of available, interactable or visible objects presented to the user. The process of identification of the target object can incorporate several sources of information like the prior likelihood of a specific object being presented, the likelihood that a specific object may evoke a signature brain activity response, etc. A HCI system as described herein (e.g., HCI systems 100, 200, 300, 1200, and 1300) can use any suitable procedure to implement a presentation of a set of interactable objects to a user, and can implement any suitable procedure to identify an intended target object to be selected by the user, and the procedures can be substantially similar to those described in the '846 application incorporated herein by reference in its entirety.

Figure 15:
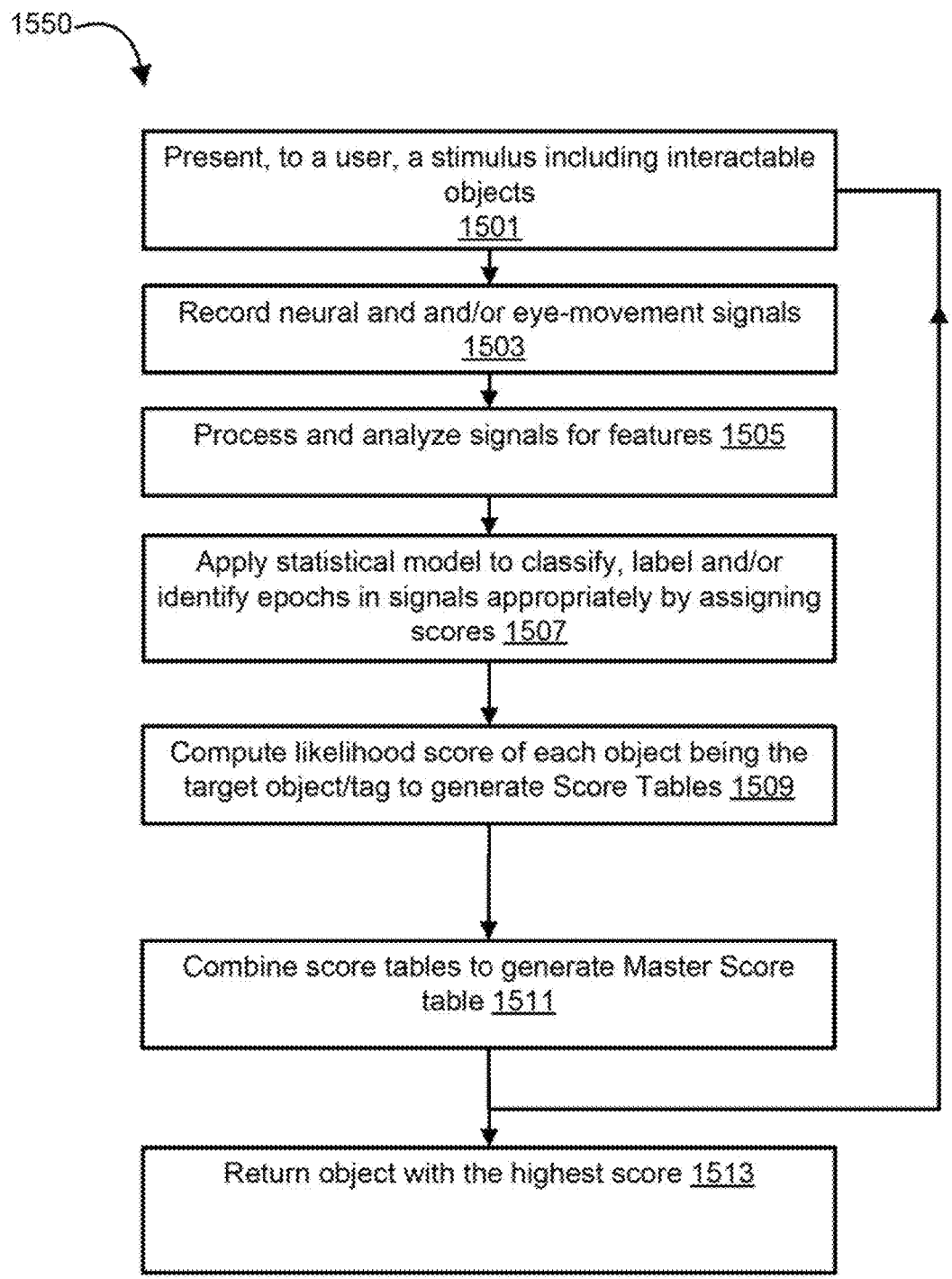
FIG. 15 illustrates a schematic flowchart of an example procedure to identify a target stimulus of interest to a user, based on user generated signals, in a HC system, according to an embodiment.

FIG. 15 shows a flowchart outlining a process 1550 of implementing a HCI system (similar to HCI systems described herein) that presents a user with a set of interactable objects and allows the user to select an object that can cause an intended action. The process 1550 can be the same or substantially similar to process 350 described herein, and/or the processes described in the '846 application referenced above. The process 1550 includes a step 1501 of presenting, a user of the HCI system, a stimulus including one or more interactable objects, each object being linked to one or more actions upon selection. At 1503 of the process 1550 signals related to behavior of the user are recorded. For example neural and/or eye-movement signals are recorded via the neural recording device and the eye-tracker. At 1505 the acquired signals are processed and analyzed. For example, the signals can be analyzed to extract features indicating user behavior such as eye-movements or cognitive states. Eye-movement signals and/or neural signals can be analyzed to calculate a user's gaze position. Gaze vectors and gaze angles can be computed to determine the user's point of focus. Procedures to calculate user interaction with interactable objects can be executed as described herein. As another example neural signals can be analyzed to detect user intent. At 1507, suitable statistical models or analytical tools can be used to classify, label and/or identify epochs in the signals (e.g., saccadic epochs in eye-movement signals, signature event related potentials in neural signals etc.). Epochs of the analyzed signals can be assigned scores to evaluate and classify the analyzed signals.

At 1509, each interactable object available to the user via the UI/UX, is scored based on the identified, labeled, and/or analyzed signals. The scores associated with the interactable objects configured to correspond to a likelihood estimate that the object is the target object of interest to the user, based on the acquired and processed signals. The scores can be assigned or associated with the objects based on the analyzed signals using one or more suitable scoring schemes, to form a Score table, listing objects and their associated scores. Separate score tables can be generated to score each interactable object on the likelihood of it being the object of interest, based on the various streams of information available to the HCI system. For example, the HCI system can generate a separate score table of objects, based on analysis of eye-movement signals (e.g., a Visual Score Table), and a separate score table generated from analysis of neural signals (e.g., a Neural Score Table), and a separate score table based on information available regarding the presentation of stimulus (e.g., a Distance Score Table) and a separate score table based on user's gaze interactions (e.g., an Interactions Score Table), etc. In some instances, one or more of the tables can be collapsed into by combining analyses at any suitable stage. For example, eye-movement signals and user interactions can be analyzed together to generate a combined Visual Score table as described in further detail below with reference to FIG. 16. At 1511 the various score tables are combined to generate a master score table. At 1513 the object with the highest score (i.e. highest likelihood of being the target object) is identified and returned. In some instances, the HCI system may seek validation from the user by presenting the identified object again. In some instances, the action associated with the identified target object is executed or implemented by the HCI system.

Figure 16:
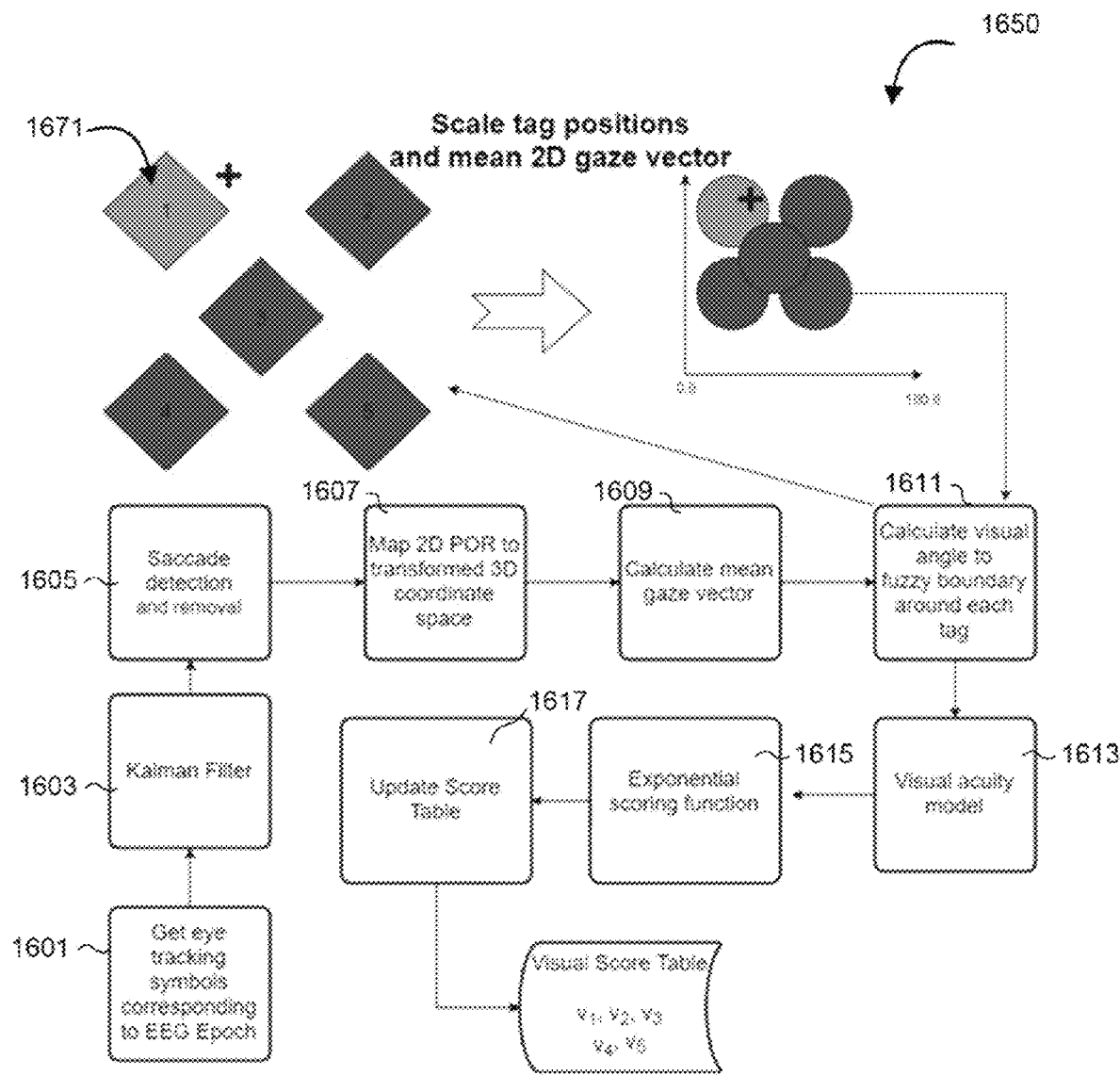
FIG. 16 illustrates a schematic flowchart of an example procedure for identifying a user's target stimulus, using eye-movement signals, in a HCI system according to an embodiment.

FIG. 16 illustrates a schematic flowchart depicting an example procedure 1650 used in some implementations of a HCI system, to compute scores based on eye-movements signals and user interactions to generate an example Visual Score table. In this example method, a user may be presented with a stimulus including five interactable objects, illustrated by the five numbered diamonds in the example UI/UX 1671 in FIG. 16. As an example, the object 1 may be of interest to the user. As the user view or experiences the stimulus neural signals are acquired along with eye-movement signals by the HCI system. EEG signals in the neural signals are analyzed to identify epochs that may correspond to a user making choices of decisions related to selecting a target object of interest.

At 1601, the eye-tracking or eye-movement signals corresponding to the epochs identified in the EEG signals are obtained. At 1603 the eye-movement signals are processed, for example using a Kalman filtering procedure. At 1605 the processed eye-movement signals are further analyzed using a feature detection procedure that may be used to either further analyze or to remove artifactual or undesired information. For example, the processed eye-movement signals may be analyzed to detect portions indicating micro-saccadic eye-movements or eye-blinks, to remove such portions.

At 1607 the relative and/or absolute locations of the available interactable objects is calculated. For example, the three dimensional space of the UI/UX is mapped on to a two dimensional plane or coordinate space, as described above with reference to FIGS. 13, 14A and 14B. At 1609 a mean gaze vector is calculated based on the eye-movement signals to determine a gaze angle and of the user. In some instances, a gaze position of the user on the two dimensional coordinate space may be computed using knowledge related to the location of the two-dimensional projection plane. In some instances the stimulus may be presented multiple times and the gaze angle or gaze position may be computed for the repeated presentation to obtain an average value.

At 1611 a visual gaze angle to fuzzy boundary around each interactable object is calculated. In some implementations the fuzzy boundary information may include considerations of noise in the eye-movement signals acquired. In some implementations the boundary may be partially determined by the boundary defined with respect the convex hull of each of the interactable objects or the boundary defined by the simple object (e.g., circle or ellipse) representing the 2D projection of the objects.

At 1613 a visual acuity model may be applied to the calculation of interaction between the user's gaze and the boundaries of the interactable objects. At 1615 each interactable object is scored using a suitable scoring scheme (e.g., on a scale from −100 to 100) to calculate the likelihood that the object is the target object of interest to the user. In some implementations the HCI system can include a visual acuity model, using eye-movement kinematics, anatomy of the human eye, and/or information about eye-movements of users to generate a predicted gaze vector. In some instances, the scoring can be based on a transformation of the biologically derived visual acuity model. In some instances, the visual acuity model can be based on exponential scaling modelled, for example, to incorporate the exponential decrease in visual acuity with increasing eccentricity. The HCI system can incorporate predicted visual angles from the acuity model, in conjunction with other user data available (e.g., eye spacing of a user, make and model of an eye-tracker, etc.).

At 1617, a score table is generated or updated to include a list of interactable objects available to the user and the associated score of each interactable object indicating its likelihood of being the target object of interest. The visual score table can be generated using the combination of results from the acuity model and the saccadic eye-movement signals, user interactions with interactable objects, and gaze vectors analyzed, a Visual Score table can be generated with oculomotor scores assigned to each interactable object based on its proximity to the calculated gaze vector. As shown in FIG. 15, the Visual Score table with scores v1, v2, v3, etc. can be used to update a Master Score described previously.

While the example process 1650 describes using neural signals at 1601, in some instances this can be omitted to analyze the eye-movement signals from the entire time frame recorded.

Example HCI Systems with Integrated Eye-Tracker, Head EEG and EMG Devices

Figure 17A:
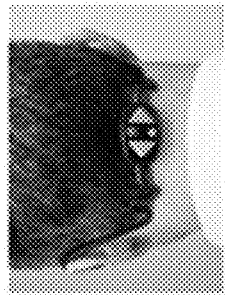
FIGS. 17A-17D are images illustrating HCI systems with a combination of ear based neural recording devices, electromyography devices, and eye-trackers, according to four different embodiments, respectively.
Figure 17B:

FIGS. 17A-17D illustrate example HCI systems with a combination of ear based neural recording devices, electromyography devices, and eye-trackers, according to four different embodiments, respectively. FIG. 17A shows a HCI system including in and/or around the ear placement of one or more EMG devices and a back of the head placement of a neural recording device, in addition to an eye-tracker (not shown). FIG. 17B shows an example HCI system including an around the ear placement of EMG devices and/or back of the head placement of neural recording devices.

Figure 17C:
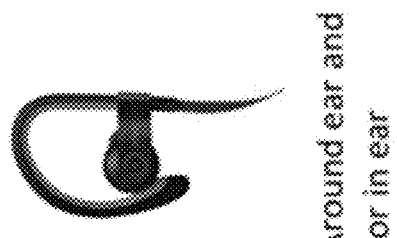
Figure 17D:

FIG. 17C illustrates portions of an example HCI device showing an around the ear and/or in the ear placement of EMG devices. FIG. 17D illustrates an example HCI system including around the ear placement of EMG devices and placement of neural recording devices to interface at predefined locations to receive neural recordings from predefined regions of the brain (e.g., Cz and Pz locations to acquire EEG recordings from the central and parietal brain regions.

Real-World Interactions Using a HCI System

As described previously, HCI systems can be used to facilitate a user's interactions with the real world and in some instances to present an augmented reality or environment to the user. In some implementations, a HCI system can be used to interpret a user's interaction with a real-world environment, even while not presenting a UI/UX interface for the user to interact with. For example, the HCI system can receive information related to the image or environment viewed or experienced by the user (e.g., via a forward facing camera or microphones) and the HCI system can process the information for the user to interact with the environment in a more robust, efficient or informative manner.

In some instances, HCI systems can be trained to process images obtained from real world environments. For example, objects of interest can be tagged with IR-reflective tape or any suitable marking substance that can be easily recognized by a camera in the eye-tracker or glasses included in the HCI system used by the user. The information obtained can be used to triangulate and obtain physical coordinates relative to the glasses.

Figure 18:
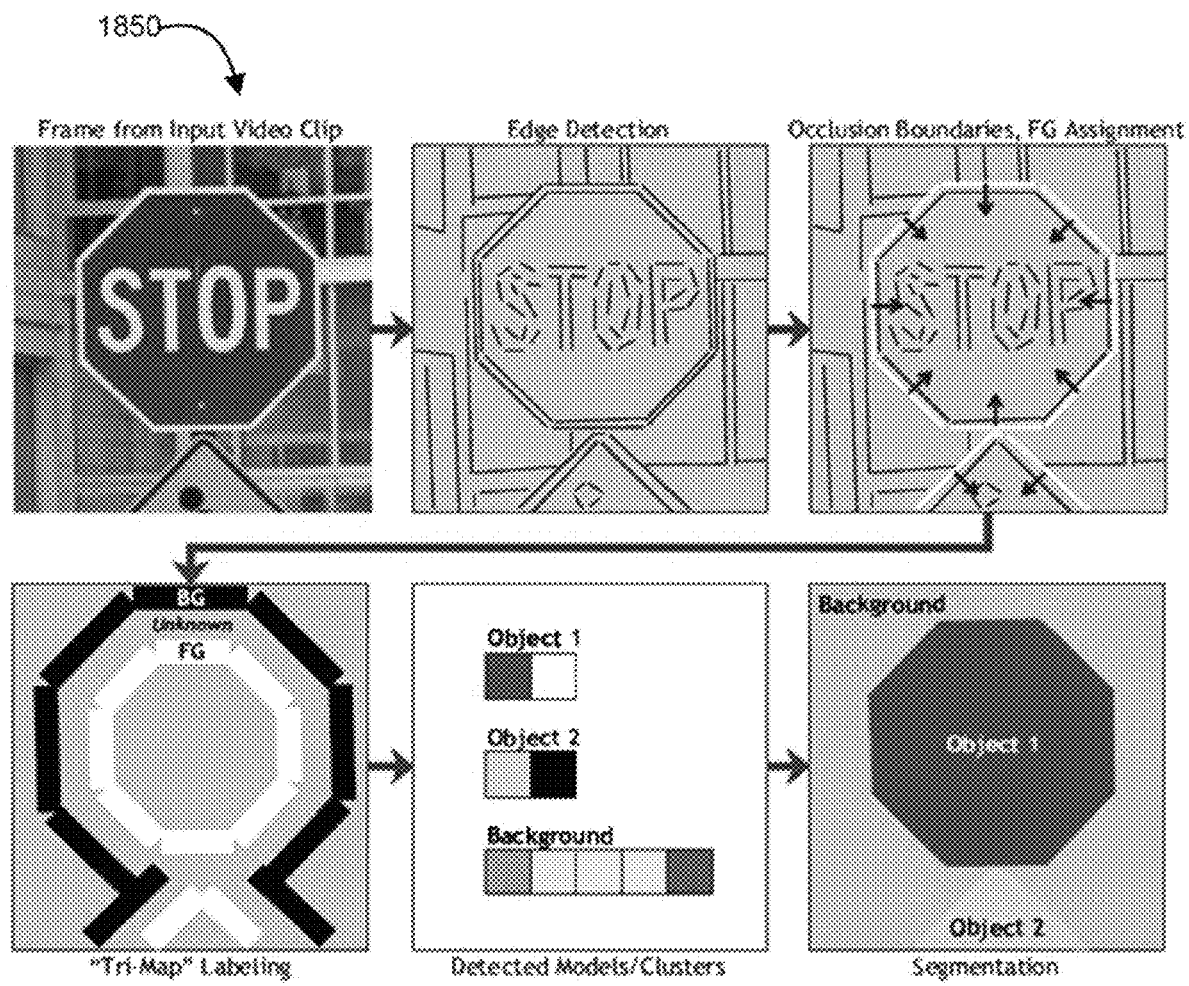
FIG. 18 schematic flowchart of an example procedure of using eye-tracking in a HCI system for analyzing and navigating a real-world environment, according to an embodiment.

In an example implementation, HCI systems can be trained or used to work directly on the 2D video space of the images recorded by the camera in the glasses and identify objects in it using computer-vision techniques, such as computational neural nets and edge-detection algorithms, etc., to extract sample points from the objects of interest so we can apply the techniques described in the previous slides to them. This method has the benefit that we do not need to pre-tag objects of interest. As long as the 2D projection of the gaze data is made to correspond with the view frustum that generates the video image, gaze and object properties can be manipulated in the same 2D space. Analyses like image processing and image segmentation can be carried out to detect or identify features of the real-world environment (e.g., vertices, edges, center of the objects, etc.). FIG. 18 shows an example user implementation of a user interaction with a real-world view of a street sign via a HCI system.

In the example process 1850 illustrated in FIG. 18, the image frame is obtained from a video clip and an edge detection procedure is carried out to determine edges of objects included in the frame. Occlusion boundaries are demarcated and used to identify foreground and background regions of the frame. Following the assignment of foreground and background regions the contours are detected and potential objects are segmented and classified based on their features (e.g., color, solid contour, etc.). Based on the classification, objects identified in the frame are numbered and presented (e.g., Object 1—the stop sign). Such identifications can assist a user in navigation through an environment and in interactions with objects in the environment.

A HCI system, according to some embodiments, can be used to gather information about a user's interactions with an environment. In some instances, data related to user interactions with predefined or known environments may be of high value to operators such as advertisers or marketers of products or services.

For example, eye movements of a person can serve as an overt measure of attention, of the person. Measures of attention of a target audience can be invaluable information for many applications of organization that are interested in human behavior such as for example, marketing companies (as a marketing tool) or gaming companies (to aid in design of environments), movie makers, etc.

Figure 19A:
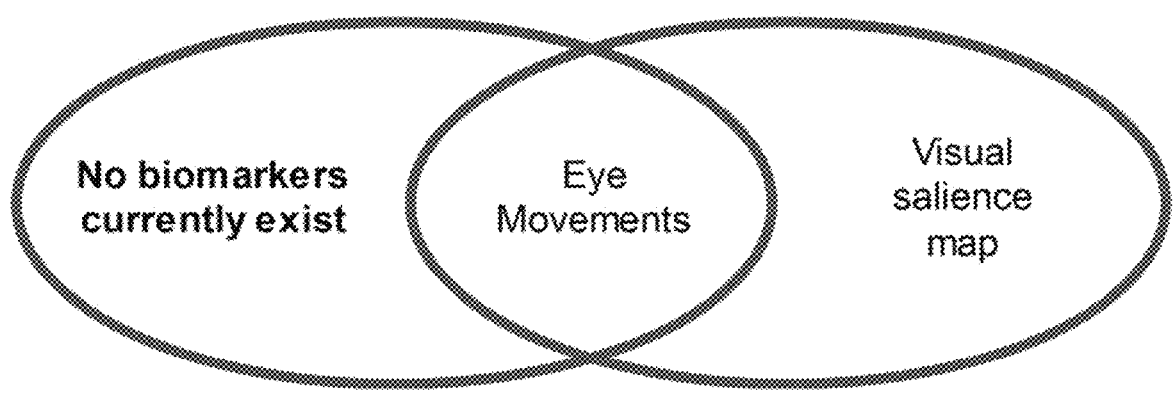
FIG. 19A illustrates the relationship between a user's focus of attention, the user's eye-movements, and salient properties of an image represented by a visual salience map.

Gaze position can be used to gather information about the focus of attention of a person. However, gaze position is controlled by a combination of bottom-up (color, shape, luminance, etc.), and top-down (contextual, executive function) signals in the brains of subjects, as shown in the illustration in FIG. 19A. Studies shown that only top-down signals can be strongly (causally) linked to likelihood of purchase/enjoyment of an object or environment. For example, if a person looks at a title of a product or service because it is "red" and having a high visual salience, but it does not impact the probability of them purchasing the product or service. While the color red may have caught the attention of the person there is not greater information related to the user's purchasing behavior, and therefore a high attention of the user linked to the red title may be irrelevant for a marketing company interested in the likelihood of the user purchasing the product or service.

Figure 19B:
FIGS. 19B and 19C illustrate a visual salience map and a visual attention map of an example image viewed by a user of a HCI system according to an embodiment.
Figure 19C:

An example process of obtaining potential information related to top-down mediated attention (related to executive function for example) may be to subtract the visual salience map (bottom-up only) from gaze position heat map (top-down+bottom-up), to determine top-down control of gaze only. This information may be highly informative about aspects of human behavior. For example, this information can be used to predict and validate human executive behavior and used as marketing information, in a more efficient manner than data containing information about gaze alone or visual salience alone. As an example, FIG. 19B shows the spatial map quantifying eye movements of a user, hotter colors indicating a higher likelihood of gaze position. This may incorrectly indicate a high user interest in the product name. However, as shown in FIG. 19C using the spatial map of eye-movements after subtracting the visual salience map, the user's attention may be mainly focused on colored text and the model, and not on the product.

Figure 20:
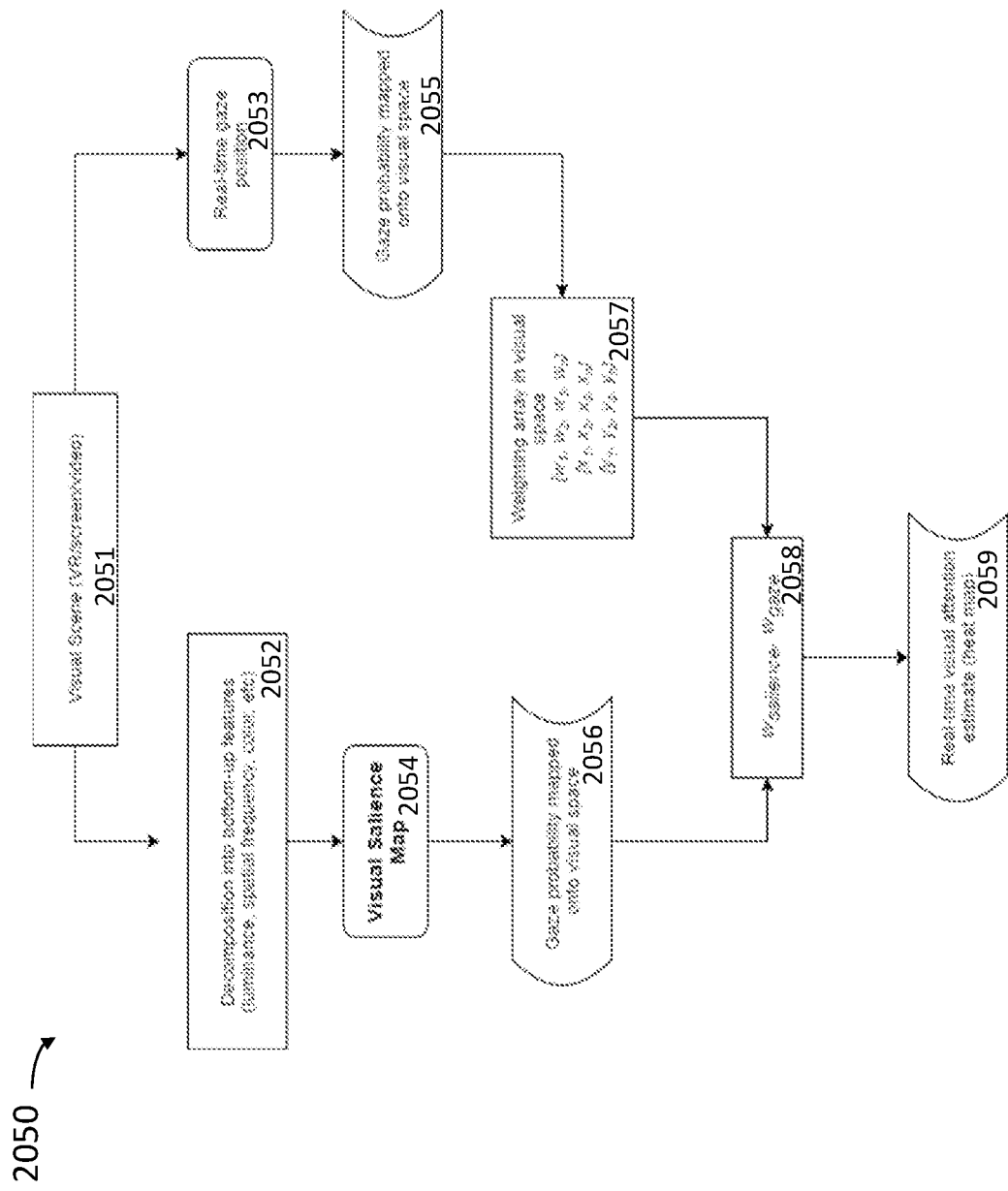
FIG. 20 is a schematic flowchart of an example procedure to generate a visual salience map and a visual attention map using a HCI system, according to an embodiment.

FIG. 20 illustrates an example process 2050 of calculating a visual salience map and a visual attention map associated with an image frame or view (e.g., an image of a real-world or an image of a virtual reality environment). At 2051, a visual image of a frame or scene is obtained. At 2052, the image is decomposed to identify portions with high salience based on bottom-up features associated with high visual salience (e.g., luminance, spatial frequency, color, movement with respect to the previous frame, contrast, etc.). At 2054, a visual salience map is generated based on the decomposition of the image. At 2056, a gaze probability map, predicting a probability of user's gaze intersecting with the portions of the image, is mapped onto the visual salience map generated at 2054.

At 2053, real-time gaze portions of the user is calculated based on eye-movement signals obtained from an eye-tracker. At 2055, an actual gaze probability map is computed and mapped onto the visual space defined by the image. At 2057, a set of weights are defined each weight associated with a defined portion (e.g., pixel) of the image, the weights being based on to the gaze probability map generated at 2055.

At 2058, the predicted gaze probability map generated at 2056 is converted to a set of weights corresponding to each portion of the image (e.g., pixel) and the weights derived from the predicted gaze probability map are combined with the weights derived from the actual gaze probability map. To for man array of weights.

Figure 21:
FIG. 21 is an example of a visual attention map that can be generated by a HCI system of an embodiment.

At 2058, the set of combined weights is applied on the image to generate a weighted image (e.g., an image generated from the difference of gaze probability and visual salience). At 2059, based on the weighted image at 2058, a real-time visual attention estimate map (e.g., a heat map) is generated, indicating points of user interest that may be linked to higher executive functions. FIG. 21 illustrates an example heat map indicating points of user attention. The implementation of the above procedure can be used in some instances as a smart filter to estimate or fill in information about visual scenery that would not otherwise be available (e.g., when a user views an environment while at high-speed motion).

Affective State Determination

Figure 22A:
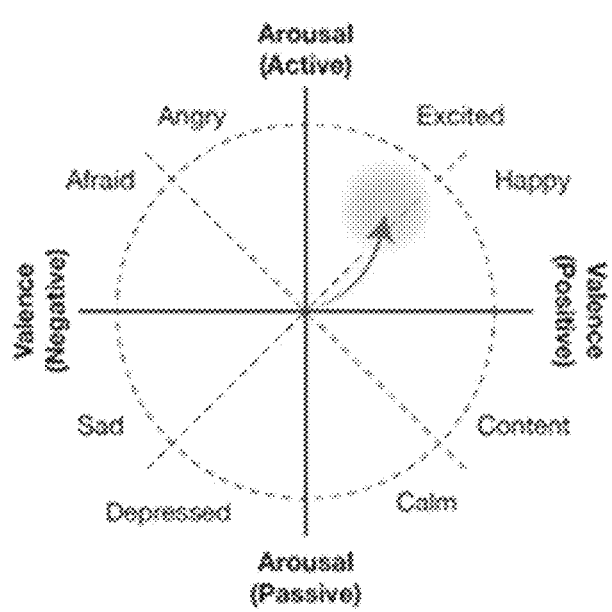
FIG. 22A is a schematic representation of various states of emotion, according to an example model of emotional states.

In some implementations, a HCI system described herein can be used to gather information about a user's emotional or cognitive state, as described previously. For example, HCI systems can be used as emotion or affective state detection systems when a set of users are monitored while experiencing predefined UI/UX environments. FIG. 22A illustrates a schematic mapping various affective states on a surface defined by axes of arousal and valence.

Current implementations of affective state models may need to be trained on a per-user and per-session basis, in order to generate an explicit range of emotions. Training may consist of user's watching or experiencing ~30-60 1 min videos, which may be time consuming. Furthermore, current techniques involve self-reporting on the associated affective states which may be contaminated by inherent bias, may be time consuming, and inaccurate. Thus, automatic affective state determination using a HCI system in an unsupervised or semi-supervised manner may be efficient and accurate compared to current methods.

Figure 22B:
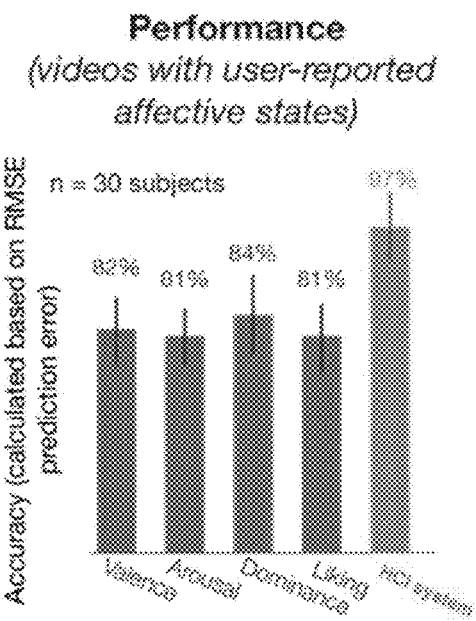
FIG. 22B is a plot showing the accuracy of detecting various emotional states by user-reported methods compared to detecting using a HCI system according to an embodiment.
Figure 22C:
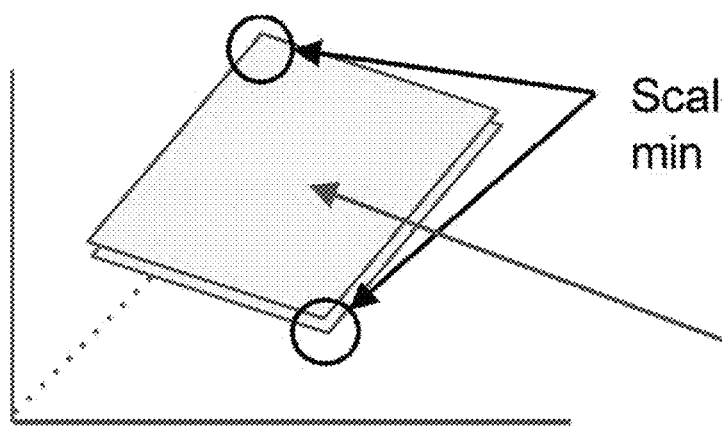
FIG. 22C is a schematic illustration of an example procedure to statistically model different states of emotion using a multidimensional representation, in a HCI system of an embodiment.

An example implementation of a HCI system can be configured to obtain neural signals and/or eye-movement signals and process the signals. Some example analytical processes can include filtering of signals, extraction of neural signals like EEG signals, extraction of epochs, extraction of features corresponding to control of signature signals, performing regression analyses along meaningful axes, etc. The HCI system can be trained using a statistical model of a hyperplane from low valence/arousal to high. The model can be scaled appropriately based on available data (e.g., scale the max and min from only 2× training files that evoke high and low valence/arousal extrema). An example hyperplane is illustrated in FIG. 22C. An example set of results in detecting emotions based on user reported values and based on a HCI system is shown in the plot in FIG. 22B.

CONCLUSION

In summary, systems and methods are described herein for use in the implementation of an integrated hybrid Human Computer Interface system operable by a user, or jointly operable by multiple users, in real-time. Embodiments of the disclosed system include an eye-movement tracking system, a neural activity tracking system, and several additional systems configured to track user behavior such as an EMG tracking system, a body position or head position tracking system, etc. The embodiments described herein are configured to implement a pointing control feature and/or an action control feature. In some example the embodiments are configured to gather data related to the user's behavior to be used for analyses. In some embodiments, the pointing and action control features are implemented through the presentation of a UI/UX strategically designed to enable high speed and accurate operation. Additionally, some embodiments of the disclosed systems and methods are configured such that they can be hardware agnostic to implement a real-time HCI on any suitable platform to mediate user manipulation of virtual, augmented or real environments.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

The invention claimed is:

1. A non-transitory processor-readable medium storing code representing instructions to be executed by a processor, the instructions comprising code to cause the processor to:
generate an interactive user environment that can be manipulated, by a user, to perform a set of actions;
define a set of stimuli that can be presented to the user via the interactive user environment;
generate a grid of objects in three dimensional space, the grid being configured to have a predetermined density of objects, the predetermined density corresponding to an indication of granularity of the measure of reliability of the eye-tracker;
generate a density control configured to allow modification of a value of the predetermined density of objects;
present the grid of objects in three-dimensional space, and a graphical indicator at a first location, the graphical indicator configured to direct a point of focus of the user to the first location;
present, via a display, at least one stimulus from the set of stimuli to the user;
receive, from an eye-tracker, eye-movement signals generated by the user;
determine, based on the presentation of the graphical indicator, an expected point of focus of the user;
determine, based on the eye-movement signals, an actual point of focus of the user;
compute, based on a comparison of the expected point of focus and the actual point of focus, a measure of reliability of the eye-tracker;
automatically calibrate the eye-movement signals based on the measure of reliability of the eye-tracker to generate a set of calibrated eye-movement signals;
determine, based on the set of calibrated eye-movement signals and the stimulus presented, a point of focus of the user;
determine, based on the point of focus, an action intended by the user; and
implement the action via the interactive user environment.

2. The non-transitory processor-readable medium of claim 1, wherein the code to automatically calibrate the eye-movement signals includes code to cause the processor to:
  generate a spatial map of reliability of the eye-tracker, the spatial map configured to correspond to a spatial region of the display.

3. The non-transitory processor-readable medium of claim 1, wherein at least one of the grid of objects in three dimensional space or the graphical indicator includes
  one or more covert fixation stimuli configured to have a high likelihood of being the focus of attention of the user, the one or more covert fixation stimuli having higher visual salience.

4. The non-transitory processor-readable medium of claim 1, wherein
  at least one of the grid of objects in three dimensional space or the graphical indicator includes one or more covert fixation stimuli configured to have a high likelihood of being the focus of attention of the user, the one or more covert fixation stimuli having at least one of increased contrast in luminance, dynamic movement, or increased spatial frequency.

5. The non-transitory processor-readable medium of claim 1, the instructions further comprising code to cause the processor to:
  receive, from a neural recording device, at least one of electroencephalogram (EEG) signals or electromyogram (EMG) signals generated by the user,
  the code to determine the action intended by the user including code to determine the action intended by the user at least partially based on at least one of the EEG signals or the EMG signals.

6. The non-transitory processor-readable medium of claim 5, wherein the at least one of EEG signals or EMG signals includes a first set of EMG signals, the instructions further comprising code to cause the processor to:
  receive an indication of a source location associated with the first set of EMG signals; and
  process the first set of EMG signals based on the indication of source location to generate processed EMG signals,
  the code to determine the action intended by the user including code to determine the action intended by the user at least partially based on the processed EMG signals.

7. The non-transitory processor-readable medium of claim 6, wherein the indication of source location is associated with at least one of: a zygomatic muscle, or a corrugator muscle.

8. The non-transitory processor-readable medium of claim 6, wherein the indication of source location includes an indication associated with a location in or around an ear of the user.

9. The non-transitory processor-readable medium of claim 1, the instructions further comprising code to cause the processor to:
  receive, from a neural recording device, at least one of EEG signals or EMG signals generated by the user; and
  determine, based on the at least one of the EEG signals or the EMG signals, an affective state associated the user,
  the code to determine the action intended by the user including code to determine the action at least partially based on the affective state associated with the user.

10. A non-transitory process or-readable medium storing code representing instructions to be executed by a processor, the instructions comprising code to cause the processor to:
  generate an interactive user environment that can be manipulated, by a user, to perform a set of actions;
  define a set of stimuli that can be presented to the user via the interactive user environment;
  present, via a display, at least one stimulus from the set of stimuli to the user;
  receive, from an eye-tracker, eye-movement signals generated by the user;
  present a scaling-bias calibration stimulus configured to prompt a visual search by the user;
  receive, from the eye-tracker, a set of calibration eye-movement signals generated by the visual search by the user;
  determine, based on the set of calibration eye-movement signals, a first maximum and a first minimum gaze position of the user along a first axis;
  determine, based on the set of calibration eye-movement signals, a second maximum and a second minimum gaze position of the user along a second axis orthogonal to the first axis; and
  compute, based on the first maximum and first minimum gaze positions and the second maximum and the second minimum gaze positions, and the scaling-bias calibration stimulus, a measure of scaling and a measure of bias associated with a set of eye-movements of the user;
  automatically calibrate the eye-movement signals to generate a set of calibrated eye-movement signals based on the measure of scaling and the measure of bias.

11. The non-transitory processor-readable medium of claim 10, wherein at least one of the measure of scaling and a measure of bias are configured to have an exponential relationship with a measure of eccentricity associated with gaze position along the first axis or the second axis.

12. The non-transitory processor-readable medium of claim 10, the instructions further comprising code to cause the processor to:
  receive, from a neural recording device, at least one of EEG signals or EMG signals generated by the user in response to the stimulus; and
  determine, based on at least one of the EEG signals or EMG signals or the set of calibrated eye-movement signals, an action intended by the user.

13. The non-transitory processor-readable medium of claim 12, the instructions further comprising code to cause the processor to:
  receive, from a neural recording device, at least one of EEG signals or EMG signals generated by the user in response to the stimulus; and
  determine, based on at least one of the EEG signals or EMG signals or the set of calibrated eye-movement signals, an action intended by the user.

14. An apparatus, comprising:
an eye-tracker configured to record eye-movement signals associated with a user;
a neural recording device coupled to the eye-tracker and configured to record at least one of EEG signals or EMG signals associated with the user;
a processor operatively coupled to the eye-tracker and the neural recording device, the processor configured to:
  present, via a display, a stimulus that can be manipulated, by a user, to perform a set of actions;
  receive, from the neural recording device, at least one of EEG signals or EMG signals generated by the user;
  receive, from the eye-tracker, eye-movement signals generated by the user;

present, via the display, a scaling-bias calibration stimulus configured to prompt a visual search by the user;

receive, from the eye-tracker, a set of calibration eye-movement signals generated by the visual search by the user;

determine, based on the set of calibration eye-movement signals, a first maximum and a first minimum gaze position of the user along a first axis;

determine, based on the set of calibration eye-movement signals, a second maximum and a second minimum gaze position of the user along a second axis orthogonal to the first axis; and compute, based on the first maximum and first minimum gaze positions and the second maximum and the second minimum gaze positions, and the scaling-bias calibration stimulus, a measure of scaling and a measure of bias associated with a set of eye-movements of the user;

automatically calibrate the eye-movement signals based on the measure of scaling and the measure of bias to generate a set of calibrated eye-movement signals; and determine, based on at least one of the EEG signals or EMG signals or the calibrated eye-movement signals, an action intended by the user.

15. The apparatus of claim 14, wherein the at least one of EEG signals or EMG signals includes a first set of EEG signals and a first set of EMG signals, the processor further configured to:

combine the first set of EEG signals and the first set of EMG signals to generate a collection of signals, the processor configured to determine the action intended by the user by determining the action intended by the user at least partially based on the collection of signals.

16. The apparatus of claim 14, wherein the processor is further configured to:

receive information related to a source location associated with the at least one of EEG signals or EMG signals; and process the at least one of EEG signals or EMG signals based on the source location to generate processed signals, the processor configured to determine the action intended by the user by determining the action intended by the user at least partially based on the processed signals.

17. The apparatus of claim 16, wherein the source location includes locations associated with an ear of the user.

18. The apparatus of claim 16, wherein the source location includes locations associated with at least one of: a zygomatic muscle of the user, or a corrugator muscle of the user.

19. The apparatus of claim 14, wherein at least one of the measure of scaling and a measure of bias are configured to have an exponential relationship with a measure of eccentricity associated with gaze position along the first axis or the second axis.

20. A non-transitory processor-readable medium storing code representing instructions to be executed by a processor, the instructions comprising code to cause the processor to:

present, via a display, a stimulus including at least one interactive object at a first location relative to an eye of a user;

receive, from an eye-tracker, eye-movement signals generated by the user;

extract a set of smooth-pursuit signals from the eye-movement signals, the smooth-pursuit signals indicating a trajectory of the point of focus of the eye of the user corresponding to the first location relative to the body of the user;

receive, from a body-tracker, a trajectory of body movement of the user;

determine, based on the eye-movement signals, a calculated trajectory of the point of focus of the user;

determine, based on the first location relative to the user and the trajectory of body movement, an expected trajectory of the point of focus of the user; and determine, based on a comparison between the calculated trajectory and the expected trajectory, a measure of accuracy associated with the determination of point of focus of the user;

automatically calibrate the eye-movement signals based on the measure of accuracy to generate a set of calibrated eye-movement signals; and determine, based on the set of calibrated eye-movement signals and the stimulus presented, a point of focus of the user.

* * * * *